[12] United States Patent
Wilhelmi et al.

(10) Patent No.: US 9,277,688 B2
(45) Date of Patent: *Mar. 8, 2016

(54) AIR SEED METER WITH ADJUSTABLE SINGULATOR

(71) Applicant: Kinze Manufacturing, Inc., Williamsburg, IA (US)

(72) Inventors: Matthew J. Wilhelmi, Parnell, IA (US); Kale J. Brockmann, Walcott, IA (US)

(73) Assignee: Kinze Manufacturing, Inc., Williamsburg, IA (US)

(*) Notice: Subject to any disclaimer, the term of this patent is extended or adjusted under 35 U.S.C. 154(b) by 85 days.

This patent is subject to a terminal disclaimer.

(21) Appl. No.: 13/829,787

(22) Filed: Mar. 14, 2013

(65) Prior Publication Data

US 2014/0109813 A1    Apr. 24, 2014

Related U.S. Application Data

(60) Provisional application No. 61/717,384, filed on Oct. 23, 2012.

(51) Int. Cl.
A01C 7/04    (2006.01)
A01C 7/12    (2006.01)
A01C 19/02   (2006.01)

(52) U.S. Cl.
CPC ............... *A01C 7/046* (2013.01); *A01C 7/125* (2013.01); *A01C 19/02* (2013.01)

(58) Field of Classification Search
CPC .......... A01C 7/04; A01C 7/042; A01C 7/044; A01C 7/046; A01C 7/08; A01C 7/081; A01C 7/12; A01C 7/123; A01C 7/125; A01C 7/128; A01C 19/02; A01C 19/00
See application file for complete search history.

(56) References Cited

U.S. PATENT DOCUMENTS 5,325,801 A    7/1994    Fiorido
5,392,707 A    2/1995    Romans
(Continued)

FOREIGN PATENT DOCUMENTS

EP    0 046 709 A1    3/1982
EP    0 636 305 A1    2/1995
WO   2012129442 A2    9/2012

OTHER PUBLICATIONS

Kinze Manufacturing, Inc., PCT/US2013/065673 filed Oct. 18, 2013, "The International Search Report and the Written Opinion of the International Searching Authority, or the Declaration", mail date Feb. 6, 2014.

(Continued)

*Primary Examiner* — Christopher J Novosad
(74) *Attorney, Agent, or Firm* — McKee, Voorhees & Sease, PLC

(57) ABSTRACT

A seed metering system, for use on a row crop planter, selects individual seeds from a seed reservoir and dispenses the seeds singularly at a controlled rate. A direct drive seed metering system includes a seed disc having a plurality of suction apertures with a recessed pocket adjacent to an aperture. The recessed pockets act to agitate seeds in the seed reservoir and to direct seed flow towards the apertures. A seed path relief system provides for allowing the placement of the seeds such that they are released from an outer edge of the seed disc. An adjustable seed singulator is mounted adjacent to the face of the seed disc where inner and outer blades are adjusted radially to compensate for the singulation of various seed sizes and shapes. The seed disc is driven via engagement of an internal gear with the external gear of an independent drive motor.

20 Claims, 20 Drawing Sheets

(56) References Cited

U.S. PATENT DOCUMENTS

| | | |
|---|---|---|
| 5,842,428 A | 12/1998 | Stufflebeam et al. |
| 5,848,571 A | 12/1998 | Stufflebeam et al. |
| 6,109,193 A | 8/2000 | Crabb et al. |
| 6,516,733 B1 | 2/2003 | Sauder et al. |
| 6,581,535 B2 | 6/2003 | Barry et al. |
| 6,718,892 B1 | 4/2004 | Rosenboom |
| 6,748,885 B2 | 6/2004 | Sauder et al. |
| 7,093,548 B2 | 8/2006 | Eben et al. |
| 7,152,542 B2 * | 12/2006 | Eben et al. .................... 111/185 |
| 7,334,532 B2 | 2/2008 | Sauder et al. |
| 7,341,010 B1 | 3/2008 | Friestad et al. |
| 7,497,175 B2 | 3/2009 | Friestad et al. |
| 7,617,785 B2 | 11/2009 | Wendte |
| 7,699,009 B2 | 4/2010 | Sauder et al. |
| 8,281,725 B2 | 10/2012 | Wendte et al. |
| 8,375,873 B2 | 2/2013 | Nelson et al. |
| 8,516,969 B2 | 8/2013 | Wendte et al. |
| 8,800,457 B2 | 8/2014 | Garner et al. |
| 2013/0192504 A1 | 8/2013 | Sauder et.al. |

OTHER PUBLICATIONS

Provisional Application, Sauder, Derek A., U.S. Appl. No. 61/466,047, filed Mar. 22, 2011.

\* cited by examiner

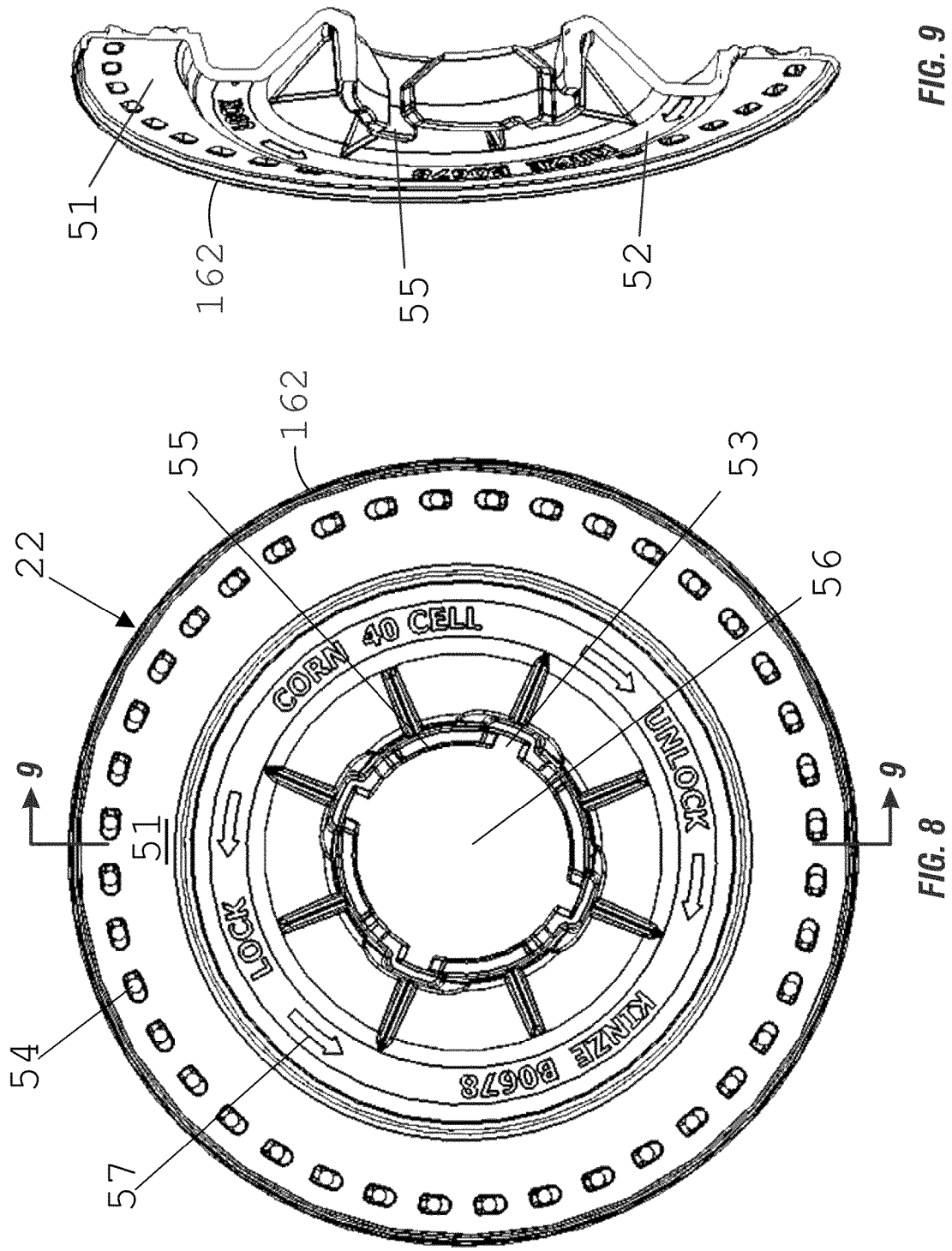

AIR SEED METER WITH ADJUSTABLE SINGULATOR

CROSS-REFERENCE TO RELATED APPLICATIONS

This application claims priority under 35 U.S.C. §119 to provisional patent application Ser. No. 61/717,384, filed Oct. 23, 2012, and which is hereby incorporated in its entirety.

FIELD OF THE INVENTION

The present invention relates generally to mechanisms used in agricultural planting machines for selecting and dispensing individual seeds. More particularly, but not exclusively, the invention relates to air seed meters used to meter seeds from a row unit on agricultural row crop planters and seeders.

BACKGROUND OF THE INVENTION

An agricultural row crop planter is a machine built for precisely distributing seed into the ground. The row crop planter generally includes a horizontal toolbar fixed to a hitch assembly for towing behind a tractor. Row units are mounted to the toolbar. In different configurations, seed may be stored at individual hoppers on each row unit, or it may be maintained in a central hopper and delivered to the row units on an as needed basis. The row units include ground-working tools for opening and closing a seed furrow, and a seed metering system for distributing seed to the seed furrow.

In its most basic form, the seed meter includes a housing and a seed disc. The housing is constructed such that it creates a reservoir to hold a seed pool. The seed disc resides within the housing and rotates about a generally horizontal central axis. As the seed disc rotates, it passes through the seed pool where it picks up individual seeds. The seeds are subsequently dispensed into a seed chute where they drop into the seed furrow.

Early seed meters were comprised of mechanical means of singulating seeds. These meters were constructed such that fingers on the face of the seed disc gripped seeds as they passed through the seed pool, subsequently releasing those seeds as they passed over the seed chute. Although these mechanical seed meters are effective, they are limited in their ability to assure singulation of seeds and are prone to dispensing duplicates (i.e., multiple seeds) and/or failing to dispense at all (i.e., skips or misses). Other mechanical meters use cells in conjunction with brushes to trap seeds within the cavity and release them over the seed chute.

Systems that are more recent include an air seed meter, e.g., vacuum or positive pressure meters, wherein the mechanical fingers have been replaced by a disc with apertures. A pressure differential is formed across opposite sides of the seed disc, which generates a suction force at the seed cell apertures. As unobstructed seed cells pass through the seed pool, seeds are drawn onto or against the seed cells and remain thereon until the seed cell passes through a region of the housing with a reduced pressure differential. To create this reduced pressure differential region, generally the "vacuum" (i.e., lower pressure) side of the seed disc is exposed to air pressure near, but not always at, atmospheric levels. At this point, seeds are released from the seed cell of the seed disc and into the seed chute. Compared to mechanical meters, air seed meters promote improved singulation across a wider range of speeds. A problem that exists with an air seed meter is that it can be difficult for the suction (negative) force of the seed cell to draw seeds from a stagnant seed pool. Another problem with air seed meters, and specifically the seed disc, is that seeds not released at or near the edge of the seed disc are susceptible to increased ricochet or bounce, thereby negatively impacting seed spacing. For those air seed meters that do release seeds from at or near edge of the seed disc, seeds are sometimes knocked free of the cells on the seed disc by the seed meter housing sidewall because of the close proximity of the housing sidewall to the cell.

Therefore, there is a need in the art for an improved seed metering system that improves upon attaching seed from the seed pool to the seed disc. There is also a need in the art for a seed meter that retains the advantage of releasing seed from at or near the edge of the seed disk, but yet reduces the likelihood of unintentionally bumping the seed from the disc during rotation.

Seed spacing in the seed furrow is controlled by varying the rotational speed of the seed disc. Most commonly, seed disc rotation is driven by connection to a common driveshaft. The driveshaft runs horizontally along the length of the toolbar to connect to each row unit, and is driven by a single motor or a ground contact wheel. In this configuration, the planting rate can be adjusted for all row units uniformly by adjusting the rotational speed of the common drive shaft. This can be a tedious task, and an operator is unlikely to adjust the gear ratio as often as necessary to maximize yields. Generally, an optimal overall rate for a given acreage will be selected prior to planting and will be maintained at that rate regardless of soil conditions. Whether using a mechanical or vacuum style seed disc, the seed disc is installed inside of the seed meter using independent fasteners and requires the use of tools to facilitate changing the disc. For example, if a farmer uses the same planter to plant corn and soybeans, he would use a different disc for the respective seed types. With planters continuing to grow in size, and more row units being added, the task of changing seed discs using independent fasteners and tools adds unnecessary burden to changing out seed discs.

There is thus a need in the art for a method and apparatus for changing the seeding rate of a seed meter to account for varying conditions, while also providing an easy to change or install method for removing and inserting a seed disc of the seed meter and rigidly retaining that seed disc within the seed meter housing.

As the art of planting progresses, emphasis on the ability of a seed metering system to accurately and consistently distribute seeds to the seed bed grows. Singulation of seeds by seed meters and spacing of seeds along the seed bed is critical in assuring that a farmer or operator is getting the maximum crop yield out of a given acreage of land. If seeds are located too closely together, or in duplicates, they will compete with each other for available nutrients and moisture in the soil, negatively impacting growth. If seeds are located too far apart, or skipped entirely, useful nutrients and moisture will go unused by the growing crops and the farmer will not realize full yield potential of the land. The increased use of GPS and computer software to generate yield maps has provided farmers the information necessary to determine optimal real time seed spacing for each row.

Thus, there is also a need in the art for a seed meter that allows for quick and easy adjustment to adjust the spacing between seeds planted in a row.

SUMMARY OF THE INVENTION

It is therefore a primary object, feature, and/or advantage of the present invention to improve on or overcome the deficiencies in the art.

It is another object, feature, and/or advantage of the present invention to reduce the frequency of duplicate seeds being selected by a single seed cell.

It is yet another object, feature, and/or advantage of the present invention to provide a seed singulator with adjustable aggressiveness settings to account for different types, shapes, and sizes of seed.

It is still another object, feature, and/or advantage of the present invention to provide a radially adjustable singulator to quickly and easily adjust the aggressiveness of the singulator.

It is a further object, feature, and/or advantage of the present invention to provide a removable singulator for use with a seed meter.

It is still a further object, feature, and/or advantage of the present invention to provide a singulator that includes adjustable blades with ramps thereon, wherein the space between the ramps of the blades provides the aggressiveness of the singulator.

These and/or other objects, features, and advantages of the present invention will be apparent to those skilled in the art. The present invention is not to be limited to or by these objects, features and advantages. No single embodiment need provide each and every object, feature, or advantage.

According to an aspect of the invention, an air seed meter is provided. The air seed meter includes a housing including a seed meter side and a vacuum side, a disc mounted in said housing for rotation about an axis and having a plurality of seed cells spaced radially about the axis for retaining seeds, and an adjustable singulator for eliminating seed doubles from said seed cells. The singulator includes two blades adjacent to and at least partially surrounding the seed cells. The blades of the singulator can be simultaneously adjusted such that a first blade is translated radially away from the axis while a second blade is adjusted radially toward the axis, and that the first blade can be also be adjusted radially toward the axis while the second blade is adjusted radially away from the axis.

According to another aspect of the invention, a singulating mechanism for use with an air seed meter of an agricultural implement is provided, with the singulating mechanism positioned adjacent a seed disc having a radial array of seed cells. The mechanism includes a first blade positioned adjacent an outer edge of the seed cells of the seed disc, and comprising at least one ramp extending toward the seed cells. It also includes a second blade located adjacent an inner edge of the seed cells of the seed disc and comprising at least one ramp extending toward the seed cells. The first and second blades are both adjustable both toward and away from the seed cells to adjust the spacing between the ramps of the first and second blades.

According to yet another aspect of the invention, a combination seed disc and singulator is provided. The combination includes a seed disc comprising a cylindrical member having a vacuum side and a seed reservoir side, with the seed disc also comprising a radial array of seed cells spaced from an axis. The singulator comprises a first blade including at least one ramp positioned adjacent an outer edge of the seed cells and extending generally toward the axis, and a second blade including at least one ramp positioned adjacent an inner edge of the seed cells and extending generally away from the axis. Also included is a rotary adjustment operatively attached to the singulator such that rotation of the rotary adjustment adjusts the distance between the ramps of the first and second blades by moving at least one of the first or second blades.

BRIEF DESCRIPTION OF THE DRAWINGS

FIG. 8 is a side elevation view of an embodiment of the vacuum side of the seed disc.

FIG. 9 is sectional view of an embodiment of the seed disc of FIG. 8.

FIG. 20 is a side elevation view of the reservoir side of the seed disc in FIG. 18a.

FIG. 21 is a perspective view of the vacuum side of the seed disc in FIG. 18a.

FIG. 22 is a perspective view of the vacuum housing of the seed meter in FIG. 18a.

Figure 1:
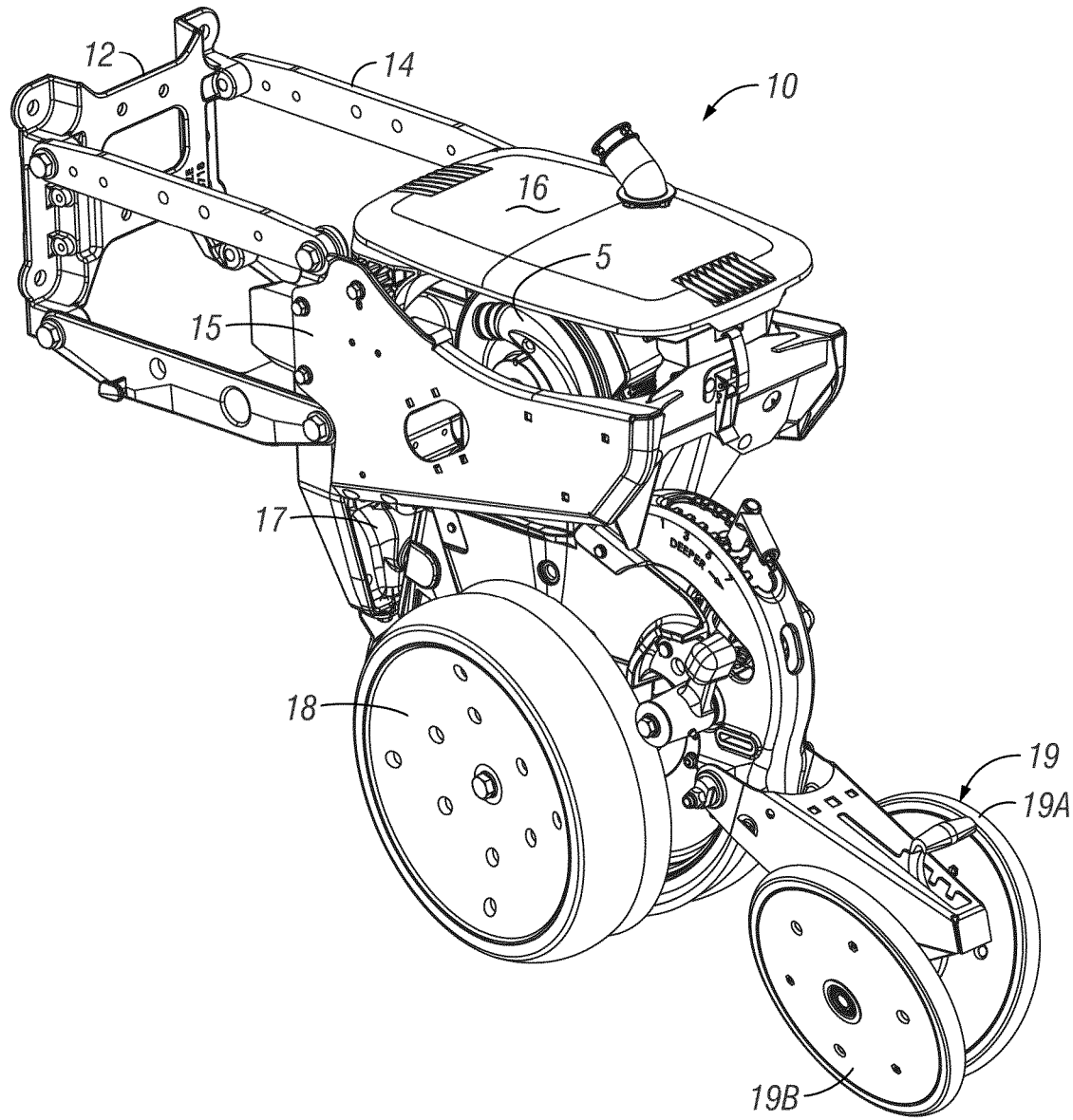
FIG. 1 is a perspective view of a conventional planter row unit with an air seed meter attached thereto.

Before any independent features and embodiments of the invention are explained in detail, it is to be understood that the invention is not limited in its application to the details of the construction and the arrangement of the components set forth in the following description or illustrated in the drawings. The invention is capable of other embodiments and of being practiced or of being carried out in various ways. In addition, it is understood that the phraseology and terminology used herein is for the purpose of description and should not be regarded as limiting.

DETAILED DESCRIPTION OF THE PREFERRED EMBODIMENTS

Figure 2:
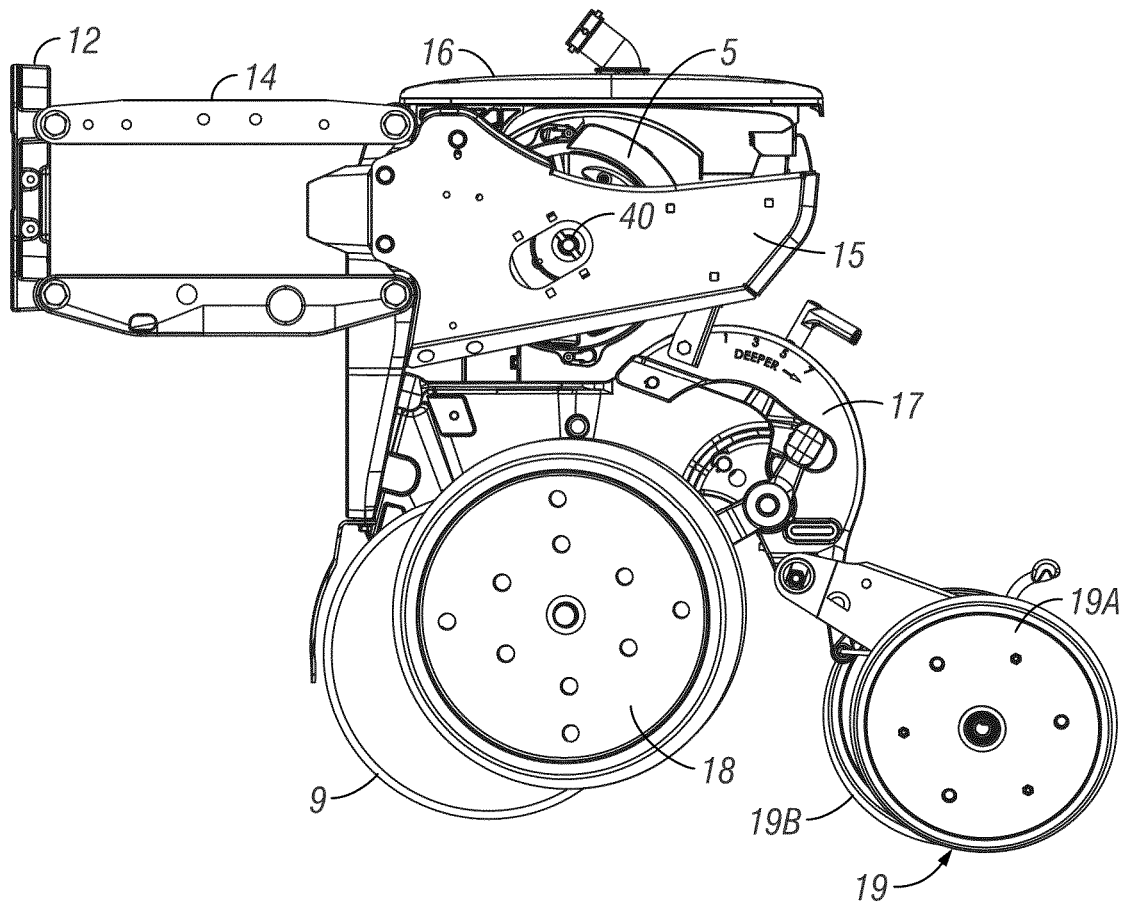
FIG. 2 is a side elevation view of the conventional row unit of FIG. 1.

Referring to FIG. 1, a conventional planter row unit 10 with an air seed meter 5 is shown. The row unit 10 and air seed meter 5, as shown in FIGS. 1 and 2, is known in its general aspects to persons skilled in the art. The row unit 10 includes a U-bolt mount 11 for mounting the row unit 10 to a planter frame or tool bar (not shown), as it is sometimes called, which may be a steel tube of 5 by 7 inches (although other sizes are used). The mount 11 includes a faceplate 12, which is used to mount left and right parallel linkages. Each linkage may be a four-bar linkage, such as the left one 14 shown in FIG. 1. It is noted that the opposite (right) linkage is generally a mirror image of the linkage 14 shown in FIG. 1. The double linkage is sometimes described as having upper parallel links and lower parallel links, and the rear ends of all four parallel links are pivotally mounted to the frame 15 of the row unit 10. The frame 15 includes a support for an air seed meter 5 and seed hopper 16, as well as a structure including a shank 17 for mounting a pair of ground-engaging gauge wheels 18. The frame 15 is also mounted to a furrow-closing unit 19, which includes a pair of inclined closing wheels 19a, 19b. The row unit 10 also includes a pair of furrow opener discs 9, as shown in FIG. 2.

Figure 3:
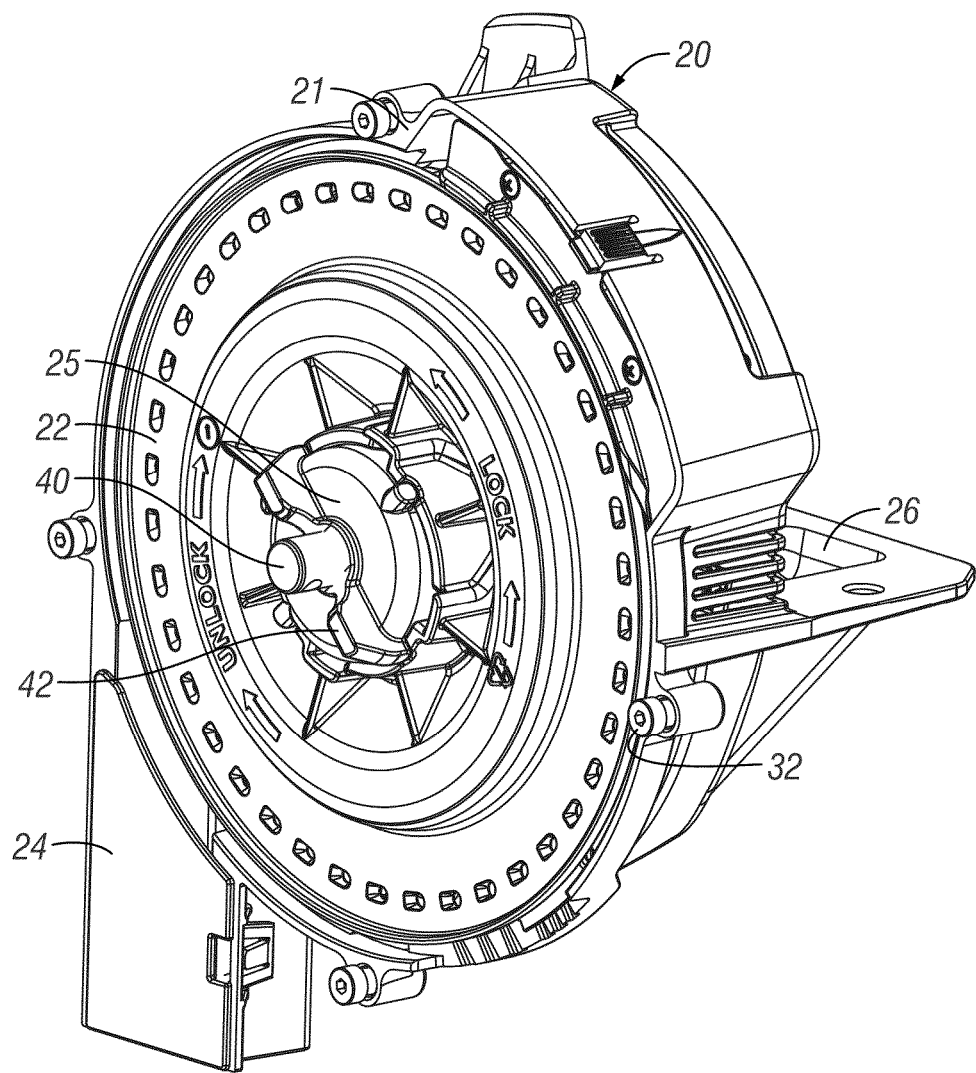
FIG. 3 is a perspective view of an embodiment of an air seed meter.
Figure 4:
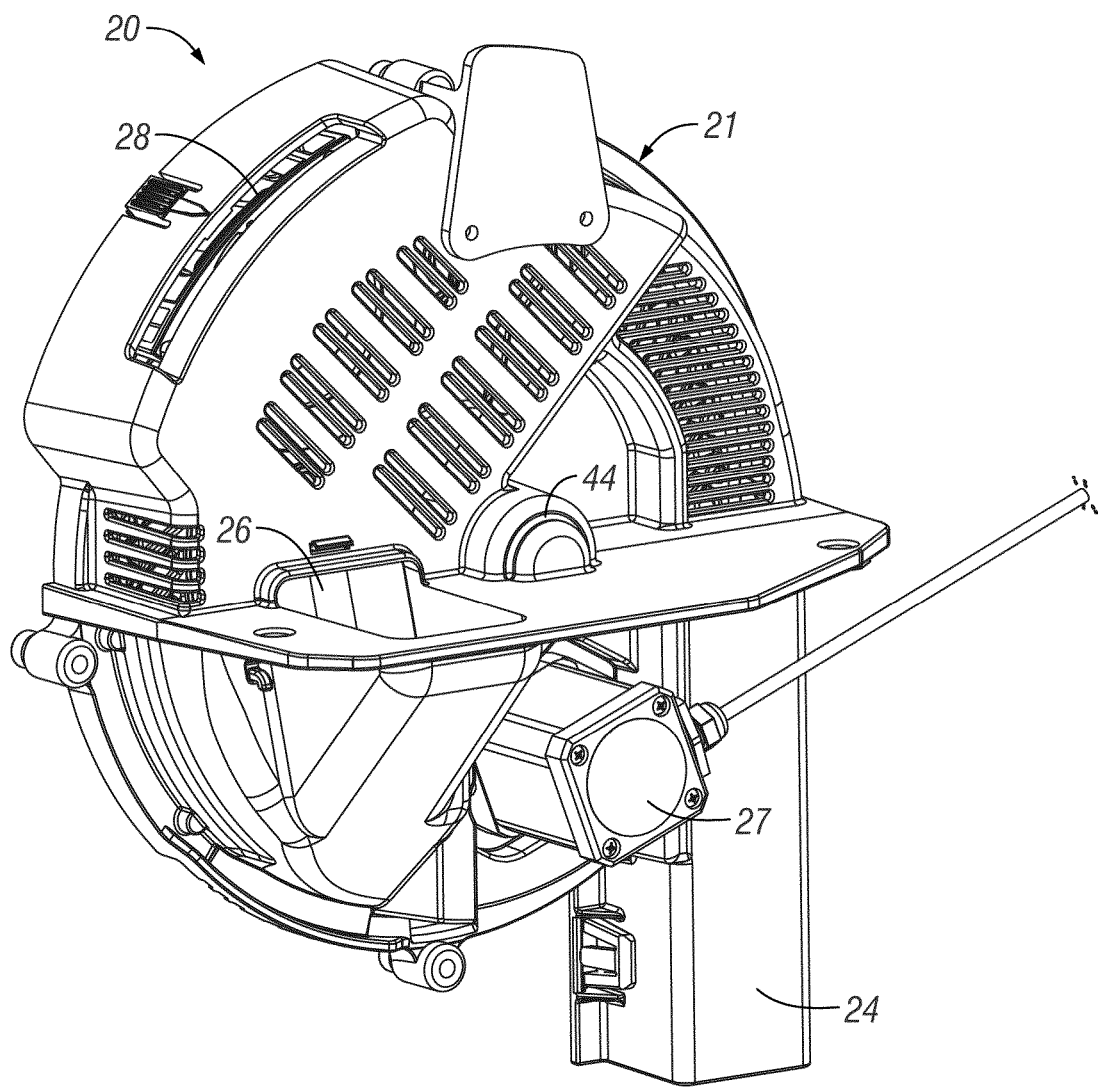
FIG. 4 is a perspective view of an embodiment of an air seed meter, showing the opposite side of FIG. 3.

FIG. 3 and FIG. 4 represent a seed meter 20 according to an exemplary embodiment of the invention. The seed meter 20 of FIG. 3 and FIG. 4 includes a seed meter housing 21, which contains the seed disc 22 and central hub 25. The seed disc 22 and central hub 25 are exposed for illustration purposes, but would normally be concealed behind a vacuum housing 200 attached to the seed meter housing 21. The vacuum housing 200, shown in FIG. 6 and FIG. 7, also includes a vacuum inlet 202 for a vacuum or other air source (not shown), an aperture 204 to allow seed disc central hub 25 to pass through, and attachment means 206 (shown to be keyhole slots) at an outer area of the vacuum housing 200. The seed meter housing 21 and the vacuum housing 200 may be molded, such that they comprise molded plastic or other rigid materials.

Figure 5:
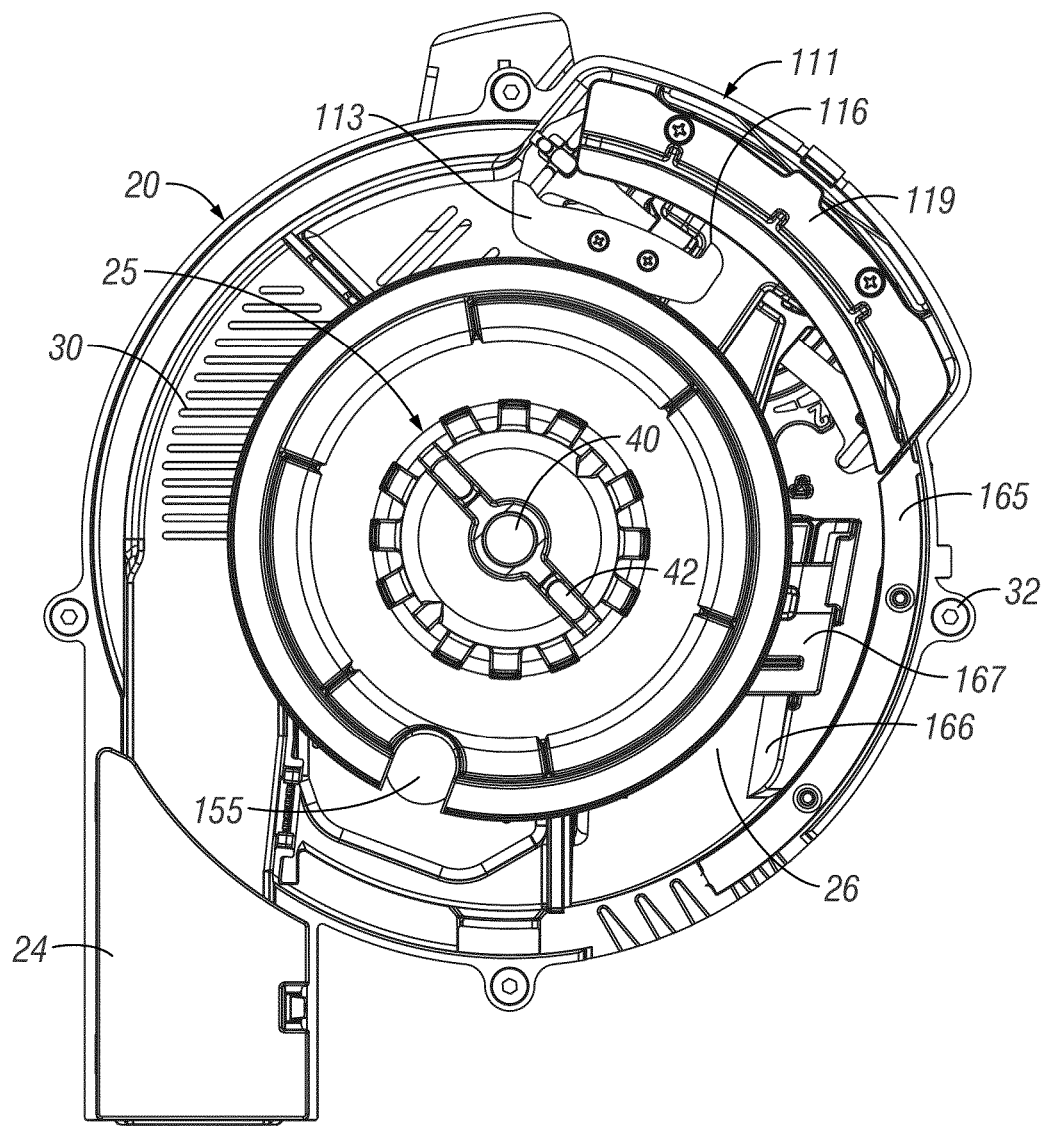
FIG. 5 is a planar view of an embodiment of the interior of the housing of the seed meter according to the invention.

Seed is conveyed into a reservoir 26 on the seed meter housing 21 via an input tube (not shown) or a seed hopper (FIG. 1). Once in the reservoir 26, the seed pools adjacent the seed disc 22 near the bottom or lower portion of the seed meter housing 21 and becomes attached to the seed disc 22 as the seed disc 22 is rotated by direct drive 27. The interior of the seed meter housing 21 without the seed disc 22 is shown in FIG. 5, which also shows the location of the reservoir 26 inside the seed meter housing 21. A door 167, which may be slidable or otherwise movable, may be positioned adjacent the reservoir opening to provide access to the reservoir 26 to aid in emptying or cleaning out the reservoir 26. FIG. 5 also shows the location and configuration of a singulator 111, which is used to prevent multiple seeds becoming attached at a single seed cell 54. The singulator 111 is shown in FIGS. 14-17. Seeds are then released from the seed disc 22 as they transition through a zone 30 of the seed meter 20 having little to no pressure differential. Seeds are dropped into the seed chute 24, which delivers them to the furrow.

Figure 6:
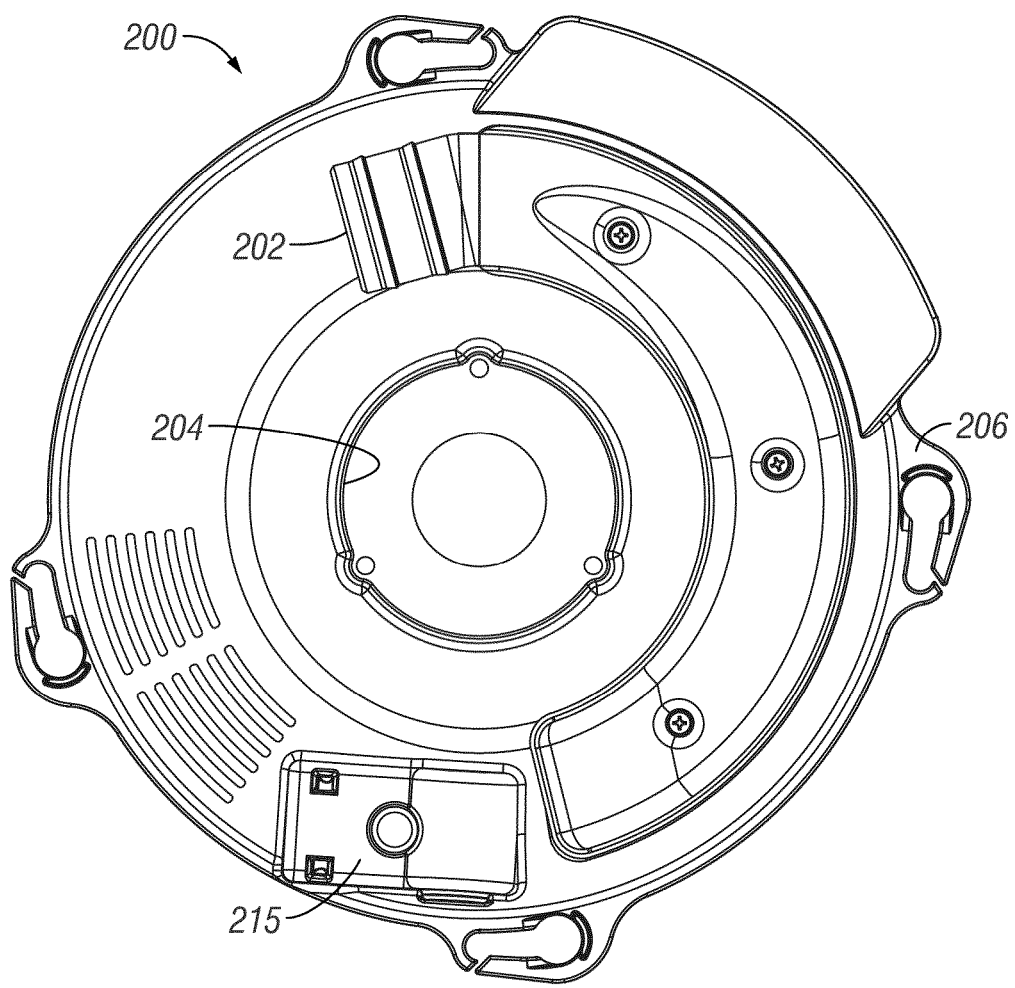
FIG. 6 is a front planar view of an embodiment of the vacuum housing of the seed meter according to the invention.
Figure 7:
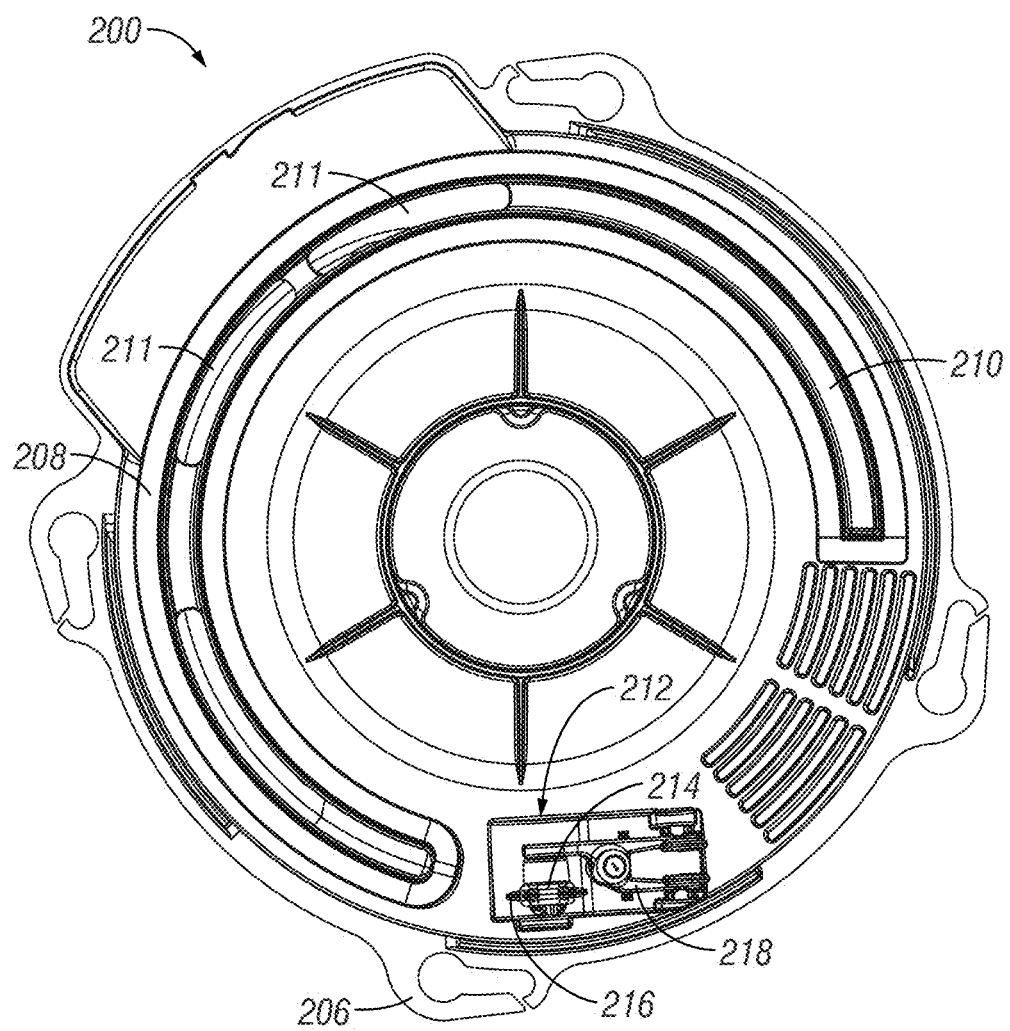
FIG. 7 is a rear elevation view of an embodiment of the interior of the vacuum housing of FIG. 6.

The vacuum housing 200, as shown in FIG. 6 and FIG. 7, includes a vacuum inlet 202, which is connected to a vacuum source (not shown), such as a vacuum impeller, via vacuum hoses (not shown). The seed meter housing 21 includes a plurality of bosses 32 disposed along its periphery, as shown in FIG. 3. The plurality of bosses 32 are configured to extend through the attachment means 206 of the vacuum housing 200 to locate the vacuum housing and, after rotation by the user, restrain it in place against the seed meter housing 21. The attachment means 206 of the vacuum housing 200 are shown to be keyhole slots, but any other configuration can be used. The vacuum housing 200 further includes a sealing member 208 fitted into a groove on the interior of the vacuum housing 200. The sealing member 208 contacts the seed flange 51 of the vacuum side of the seed disc 22 (see, for example, FIGS. 8 and 9) to define a vacuum chamber 210 in communication with the vacuum inlet 202. The sealing member 208 is also surrounded by an annular rim 162 of the seed disc 22 to improve suction at the seed cells 54. As seed cells 54 move into the vacuum chamber 210, they are placed in fluid communication with the vacuum source. A plurality of apertures 211 in the chamber 210 provide for suction from the vacuum source along the length of the chamber 210.

Also mounted to the inside of the vacuum housing 200 is a remnant ejector 212 for the removal of seeds or seed remnants from a seed cell 54 after the seed cell passes the seed chute 24 and is no longer in communication with the vacuum chamber 210. The remnant ejector 212 is housed within an ejector housing 215 formed integrally with the vacuum housing 200. However, the ejector housing 215 may also be removable so as to allow different ejectors to be used according to different seed discs and seed types. The remnant ejector 212 interfaces with a series of seed cells 54 from the vacuum side of the seed disc (shown in FIGS. 3 and 8). The remnant ejector 212 includes a rotatable wheel 214 with a plurality of punches 216 about its periphery to remove seeds, seed debris, or other remnants remaining in a seed cell 54 after it passes the seed chute 24. The remnant ejector 212 is spring-biased towards the seed disc 22 and moves synchronously with the seed disc 22 as it is rotated, i.e., the rotation of the seed disc 22 rotates the wheel 214 of the remnant ejector 212. Furthermore, the remnant ejector 212 is rotatable about legs 218 to allow the ejector to move relative to the biasing spring, which aids in pressing the punches 216 of the wheel 214 to remain biased against the seed cells 54 of the seed disc 22.

Figure 12:
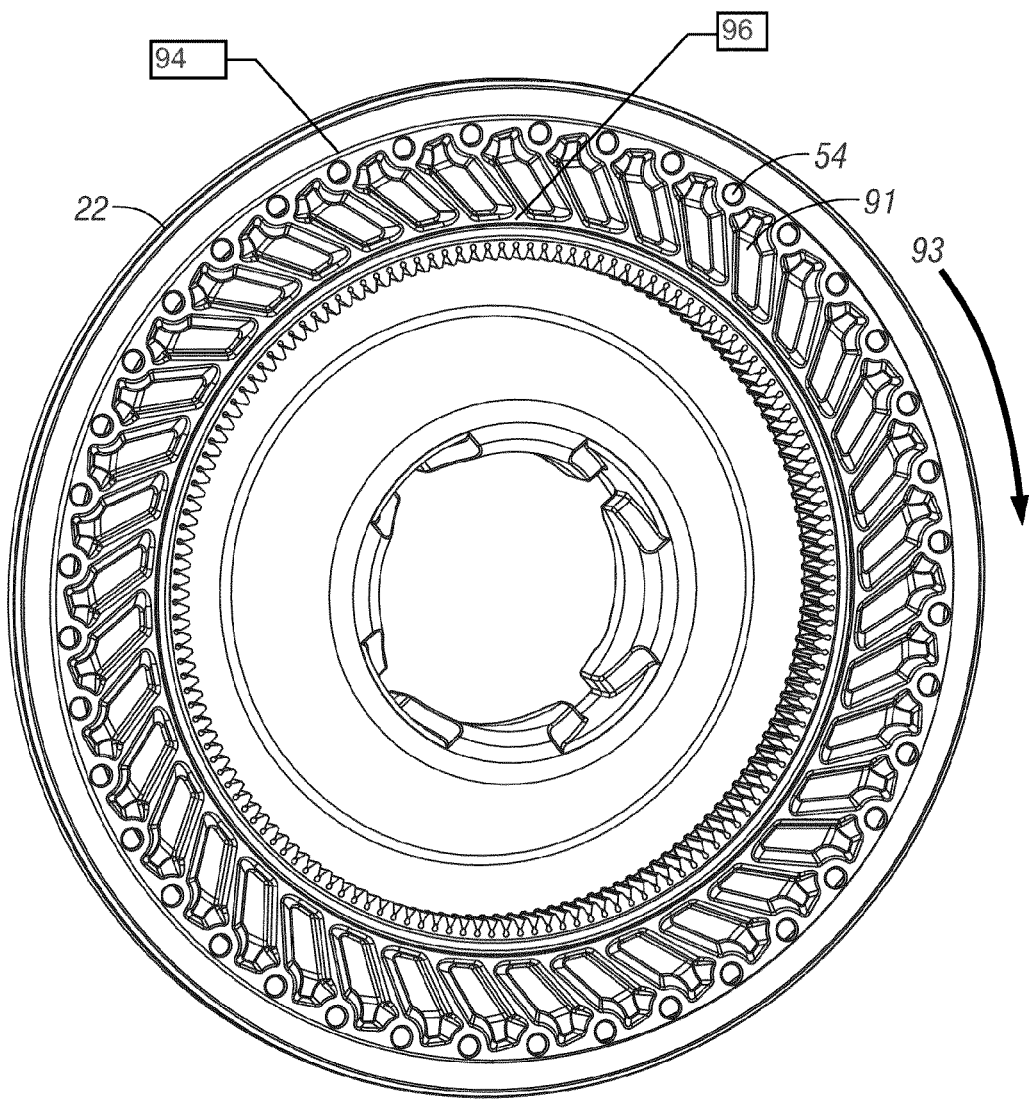
FIG. 12 is a perspective view of an embodiment of the reservoir side of the seed disc.

FIG. 8 illustrates the vacuum side of the seed disc 22. The seed disc 22 is substantially cylindrical and has opposing sides—a vacuum side shown in FIGS. 3 and 8, and a reservoir side, which contacts a pool of seed (FIG. 12). It should be noted that the "vacuum side" generally refers to the side of the disc 22 that will be adjacent the vacuum source. The seed disc 22 comprises a molded plastic or other rigid material. The seed disc 22 has a cross-sectional profile as shown in FIG. 9. The cross-sectional profile of the seed disc 22 shows at least two zones on the seed disc 22. The first zone is a generally flat seed flange 51 located at or near the outer radius of the seed disc 22. A series of seed cells 54 located at the seed flange 51 comprise apertures extending from the vacuum side to the reservoir side, and are spaced radially about the circumference of the seed disc, which is generally a circle. The aperture of the seed cells 54 may be larger on the vacuum side of the disc 22 and narrow through the disc 22 such that the negative pressure on the seed side of the disc 22 is increased. Alternatively, a single-sized aperture may form the seed cell 54. The seed flange 51 also includes an annular rim 162 extending radially outward from the plurality of seed cells 54 and which will be described later in further detail. Although in the embodiment shown in FIG. 8 a single seed cell circle is shown with seed cells 54 being positioned at an equal radius, one skilled in the art may also appreciate that seed cells could be staggered about multiple circles to create an alternating pattern. It should also be appreciated that the spacing and size of the seed cells 54 may be changed from the illustrated embodiments to accommodate different seed types and planting methods. The present seed disc and seed cells are not to be limited to the embodiments shown and described.

Figure 10:
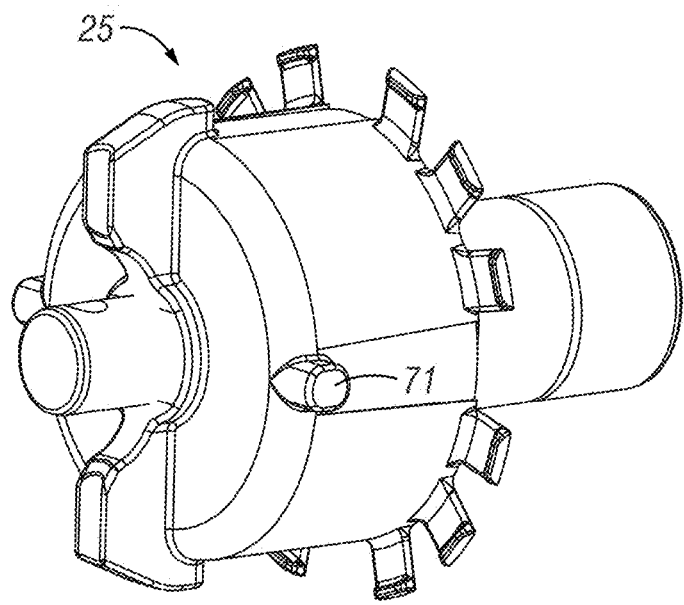
FIG. 10 is a perspective view of an embodiment central hub for use with an air seed meter.

A second zone 52 is shown by the cross-sectional profile of the seed disc 22. The second zone is contoured and located radially inward of the seed flange 51. The second zone 52 includes a cylindrical internal flange 55. The internal flange 55 is formed substantially perpendicular to the seed flange 51 and is substantially concentric with the center axis of the seed disc 22. The interior sidewall of the cylindrical interior flange 55 includes four keyways 53 running longitudinally through the interior flange 55 and spaced evenly about the inner circumference of the flange 55. The cross-section of the keyways 53 is substantially similar to the external profile of the hub protrusions 61 as shown in FIG. 10. While four keyways are shown in the figures, it should be appreciated that generally any number of keyways are contemplated for use with the seed disc 22 of the exemplary embodiment. When more or less keyways are used with a seed disc, the keyways can be radially spaced around the axis of the disc, or can otherwise be positioned to align with at least as many hub protrusions 61 for connecting the hub to the seed disc.

Figure 11:
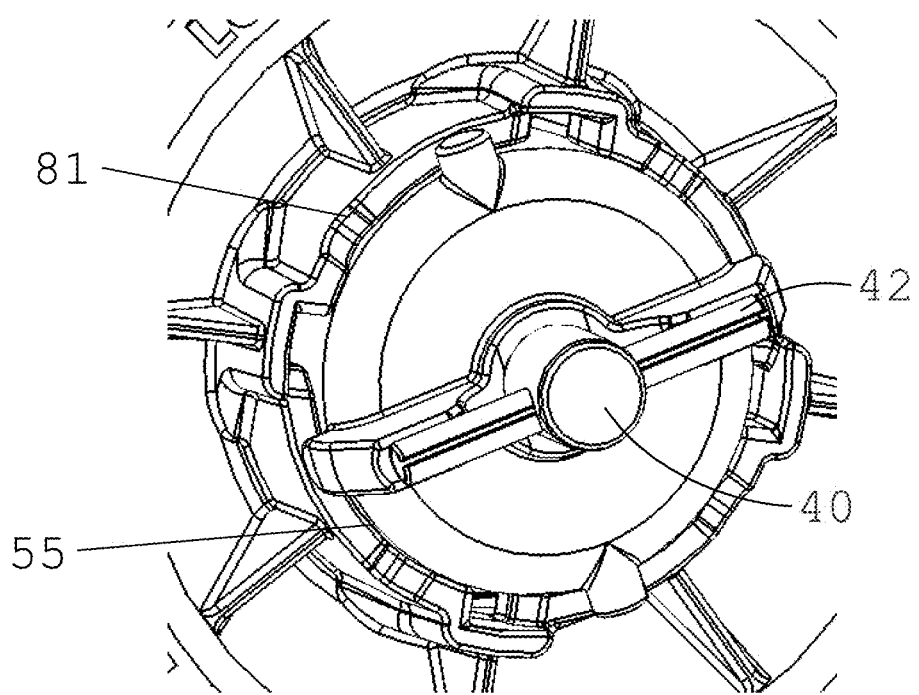
FIG. 11 is another perspective view of an embodiment the central hub of FIG. 10, shown in operative relation to a seed disc.

The seed disc 22 can be fixed within the seed meter 20 without the use of fasteners or tools by inserting the central hub 25 of the seed meter housing 21 through the aperture 56 created by the inner flange 55 of the seed disc 22. The keyways 53 of the inner flange 55 are shaped and aligned at 90-degree intervals to receive the protrusions 71 of the hub 25 (see, e.g., FIG. 10). With the central hub 25 inserted through the inner flange 55, the protrusions will emerge from the keyways 53. The hub 25 can then be rotated in the direction shown by the embossed arrows 57 (see, e.g., FIG. 8), while the seed disc 22 is restrained, such that the protrusions 71 will engage recesses or notches 81 on the rim of the interior flange 55 of the seed disc 22, as shown in FIG. 11. The seed disc 22 could also be rotated while the hub 25 is restrained to lock and unlock. The central hub 25 slidably mounts to a first end of a shaft 40 to fix the position of the seed disc 22 within the seed meter housing 21. The central hub 25 is retained in place by an upper roll pin 42 passing through an aperture on the shaft 40 and lower dowel pin, located on the shaft 40, which may otherwise be the protrusions 71 of the hub 25. The second, opposite end of shaft 40 is rotatably and axially coupled to an integrated shaft bearing. The shaft bearing (not shown) may be a plain bearing, such as generally any cylindrical sleeve made of a low friction material, a rolling-element bearing, which uses spheres or small cylinders that rotate or roll between a shaft and the mating parts to reduce friction and allow much tighter mechanical tolerances, or a water pump-style bearing. The shaft bearing is positioned in a cavity 44, as shown FIG. 4. It should be appreciated that when other numbers of keyways 53 are used to aid in attaching the seed disc 22 to the seed meter 20, the keyways may be located at other angles, such that the disc 22 or hub 25 can be rotated more or less to engage the protrusions with the recesses.

Figure 13:
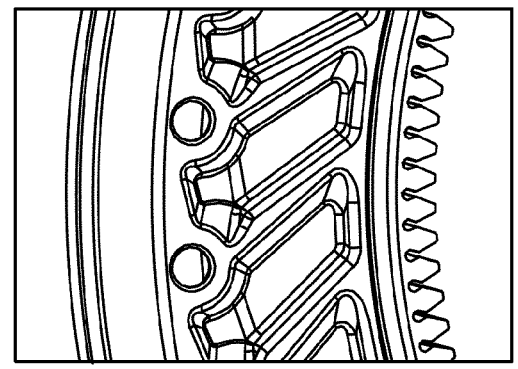
FIG. 13 is an enlarged view of a portion of the seed disc of FIG. 12, showing the seed cells and seed channels.
Figure 14:
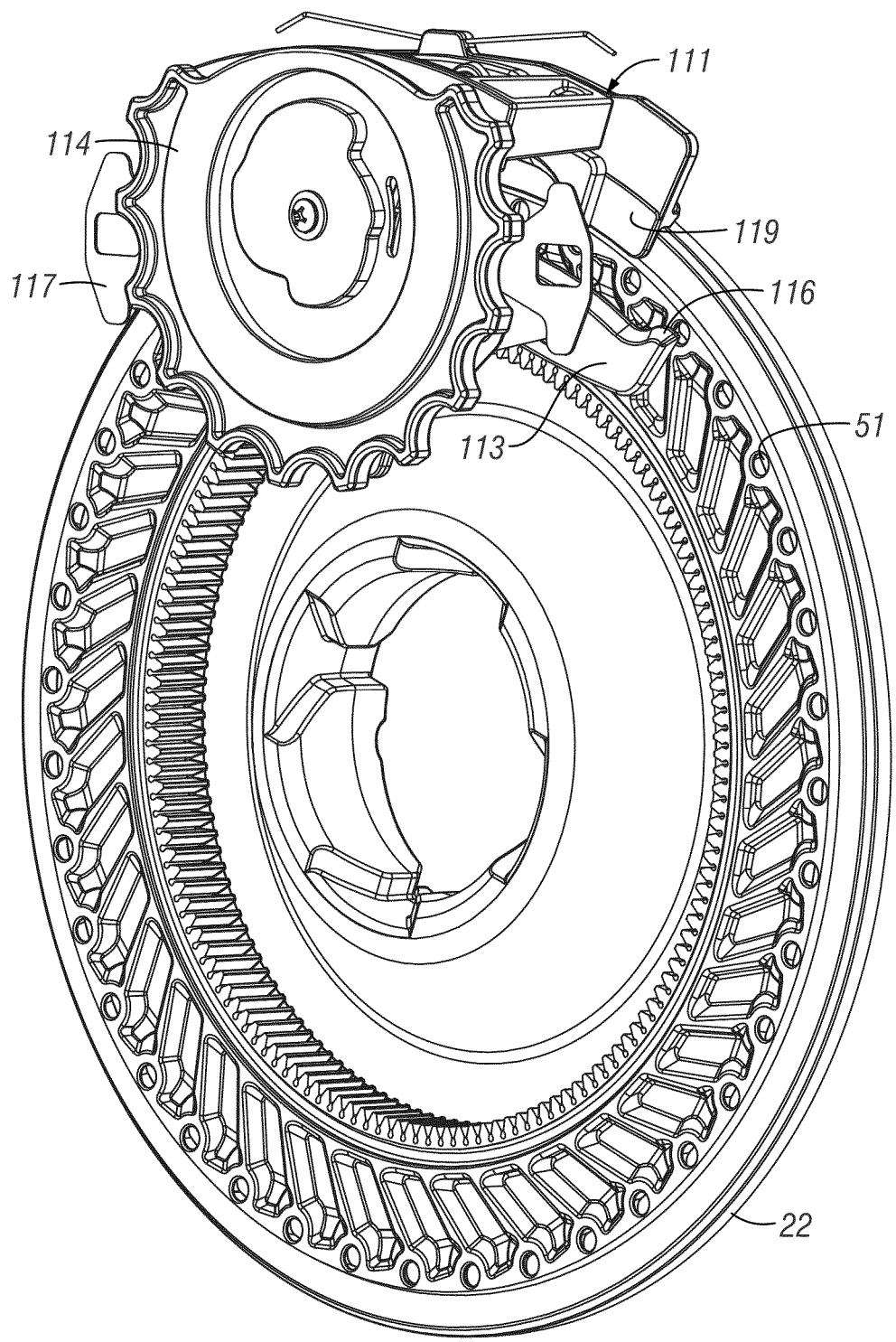
FIG. 14 is a perspective view of an embodiment of the seed disc of FIG. 12 including a singulation mechanism in operative relationship.

Turning now to the reservoir side of the seed disc 22, which is shown in FIG. 12, a plurality of recesses or channels 91 are shown formed in the seed flange 51. On the reservoir side of the seed disc 22, the seed flange 51 includes a portion extending from the face of the disc 22 and including an inner lip 96 and an outer chamfer 94. The outer chamfer 94 may be beveled or other angular in relation to the face of the seed disc 22. FIG. 13 shows an enlarged view of these recesses or channels 91. A recess or channel 91 is present for and respectfully aligned to a seed cell 54. The recess or channel 91 is positioned substantially forward of its corresponding seed cell 54 with respect to the rotational direction (as shown by the arrow 93 of FIG. 12) of the seed disc 22 during operation and provides agitation of seed in a seed pool when the seed disc 22 is rotated. The channel 91 is oriented at an oblique angle with respect to the radius line that passes through the center of corresponding seed cell 54. This angle directs seed radially outward and rearward with respect to the rotational direction 93 of the seed disc 22 during operation, such that seed is guided towards the seed cells 54. The channels 91 as shown are substantially rectangular in shape, but could be also comprise an oval or any other shape that would aid in the directing of seed towards seed cells 54. It should also be appreciated that the shape and configuration of the channels can aid in loosening seeds in the reservoir, while also guiding them towards the seed cells 54. Furthermore, the channels or recesses include a ramped portion 97 generally adjacent the seed cell 54, which is used to position the seed at the seed cell 54 during rotation of the seed disc 22.

Therefore, the channels 91 of the seed disc 22 provide numerous advantages. As the channels 91 are generally recessed areas separated by wall-like portions, they will increase agitation of the seed pool to promote the movement of the seeds from the seed pool. The recessed channels 91 will also provide a direct path from the seed pool to the seed cells 54, which will promote good adhesion between the seed and the seed disc 22 at the seed cells 54. This will aid in increasing the accuracy of the seed meter by increasing the likelihood that a seed will be adhered to the seed cell 54. As the channels 91 are formed integrally with the seed disc 22, they can be configured and numbered to match generally any number of seed cells 54 and can be oriented or sized to best match with any type of seed. In the alternative, one single channel 91 size and orientation may be configured such that it is usable with all types of seed.

In addition, the reservoir side of the seed disc 22 will include an outer chamfer 94 and an extension surface 95, which extends generally from the outer chamfer 94 to the annular lip 162 on the periphery of the seed disc 22. The outer chamfer 94 essentially forms a "false edge" of the seed disc 22, to better position the seed at or near the edge for better consistency during release of the seed into the chute 24. During rotation of the seed disc 22, and after the seeds have adhered to the seed cells 54, the disc 22 will continue to rotate until a seed passes the zone 30 of the seed meter 20 with little to no pressure differential. At this location, the outer chamfer 94 will be directly adjacent the outer wall of the seed meter housing 21, which positions the seed and seed cell 54 at the false "outer edge" of the seed disc 22. Thus, the seed will become disengaged from the seed cell at the outer edge, which will decrease the likelihood of ricochet or bounce as the seed passes through the chute 24, thereby increasing seed spacing consistency. The length of the extension surface 95 will vary based upon factors such as the amount of offset 161, the type of seed, how close the seed cells 54 need to be to the "edge", as well as other factors. The creation of the "false edge" provides for the seed to be released at or near the "edge" of the seed disc 22, while still providing enough suction as the disc 22 passes adjacent the seed pool, as will be discussed below.

In situations where duplicate seeds may be drawn onto or against a single seed cell 54, a singulator 111, such as that shown in FIGS. 5, 14, 15, and 17 can be used. The singulator 111 is configured to remove the excess seed(s) from the seed cell. The singulator 111 is mounted at and operatively connected to the seed meter housing 21 such that a first blade 112 (shown most clearly in FIG. 17) and a second blade 113 is adjacent to the reservoir side face of the seed flange 51 and the seed cells 54. The blades are spaced from the face of the seed disc 22, as well as the flange 51 and seed cells 54. The blades 112, 113 may be configured such that they are on opposite sides of the seed cell circle. The singulator 111 is biased towards the axis of the seed disc 22 and/or seed meter housing 21. The biasing towards the axis of the seed disc 22 and/or seed meter housing 21 may be provided by a spring, gravity, or other tension member, such as by attaching the singulator 111 by a wire to the seed meter housing 21. The singulator 111 is configured to have a fixed, curved rim portion 119 that at least partially surrounds the annular rim 162 of the seed disc, which aids in positioning the singulator 111 adjacent the seed cells 54.

The first blade 112 is positioned adjacent to the backside of the curved rim 119, i.e., the side furthest from the seed disc 22, and radially outward of the seed cell 54 circle. The first blade 112 includes an inner edge with a first set of ramps 115 and a generally curved profile similar to the circumference of the seed cell circle. Biasing the singulator 111, including first blade 112, generally inward towards the axis, aids in keeping the blade 112, and thus, the ramps 115, at the outer edge of the seed disc 22 to position the blade 112 and ramps 115 adjacent an outer area of the seed cells 54. This aids in removing additional seeds at the seed cells 54 so that one seed is positioned at a seed cell 54.

The second blade 113 is spaced from the first blade 112 and is positioned radially inward of the seed cell circle 54. The second blade 113 includes an inner edge (closest to the seed cell circle) with a second set of ramps 116. It should be appreciated that the singulator 111 could have other ramp configurations for different seed types and the profile of the blades are not to be limiting to the exemplary embodiment. For example, smaller seeds such as a soybean seed may need less aggressive singulation and, therefore, fewer or smaller ramps can be used than for larger seeds like corn. It should also be appreciated that first blade 112 and second blade 113 could be comprised of a plurality of individual ramp assemblies, capable of moving independent of or in relationship with one another. For instance, a first ramp on first blade 112 could move independent of or in relationship with a second ramp on first blade 112, or a first ramp on first blade 112 could move independent of or in relationship with a first ramp on second blade 113.

The first blade 112 and second blade 113 are attached to first and second carriages, 121 and 122. In addition, the first and second blades 112, 113 may be formed integrally with the carriages 121, 122. The blades 112, 113 may be attached to the carriages 121, 122 such that they can be replaced after wear and tear, or due to a change in the type of seed being using with the system. Therefore, screws, or other temporary attachments may be used to at least temporarily attach the blades to the carriages.

The first and second carriages, 121 and 122, are manipulated via a rotary adjustment 114 in a manner such that the first blade 112 adjusts radially outward as the second blade 113 simultaneously adjusts radially inward or vice versa, thus changing the width of the seed path between the first and second blades 112, 113 for the seed cells 54 to pass through. The second blade 113 is connected to the rotary adjustment 114 via a cam or other mechanism that converts the rotational movement of the rotary adjustment 114 to a translational movement of the first 112 and/or second blade 113. Thus, the second blade 113 (and/or first blade 112) moves generally towards or away from the first blade 112 in a longitudinal manner as the rotary adjustment is rotated. For example, the blades 112, 113 may be slidably connected such that the blades slide along guides, slots, or notches in the singulator 111. However, it is not required that both carriages, and thus, both blades move with rotation of the rotary adjustment 114. For example, it is contemplated that only one of the blades move when the rotary adjustment 114 is rotated to either widen or narrow the distance between the blades, and thus, the ramps on the blades. Furthermore, the curved rim 119 remains fixed while the first blade 112 moves to ensure positioning of the singulator 111 adjacent the seed cells 54.

A wider seed path typically allows for less aggressive singulation, i.e., less contact by a ramp 115, 116 with a seed(s) in the seed cell 54. A narrower seed path typically creates more aggressive singulation, i.e., more contact by a ramp 115, 116 of a seed(s) in a seed cell 54. The level of aggressiveness is determined based on a number of factors, including, but not limited to, seed size, rate of seed dispensing, type of seed, and/or the amount of suction present at the seed cell 54. However, the singulator 111 is generally configured such that only one seed is drawn onto or against the seed cell 54 and any other seeds drawn onto or against the seed cell 54 are knocked off into the seed pool. The slot 28 in the housing allows an operator to easily access the rotary adjustment 114, so as to adjust the width of the seed path between the first and second blades 112, 113 without removal of any parts. This allows the singulator 111 to be used in the seed meter 20 with a variety of types of seeds, e.g. corn, bean, etc., while also allowing quick and easy adjustment for the width of the path between the blades.

Figure 16:
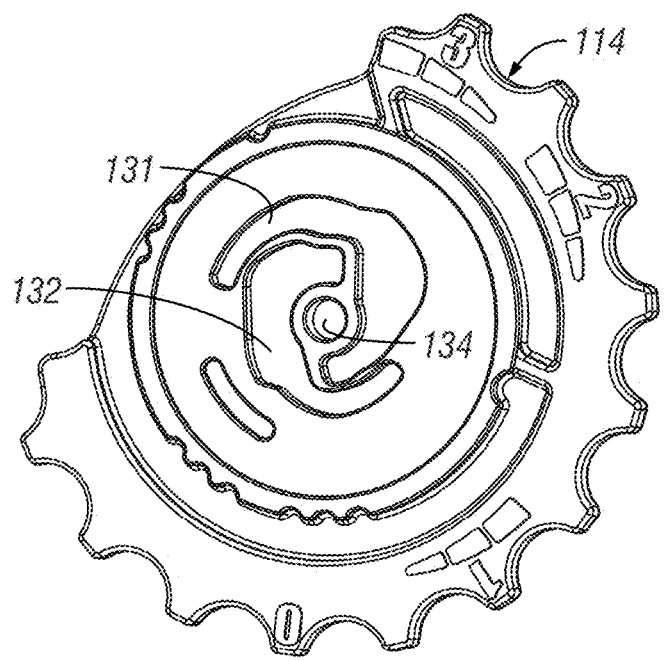
FIG. 16 is a perspective view of an embodiment showing the face of the singulation mechanism's rotational adjustment.
Figure 17:
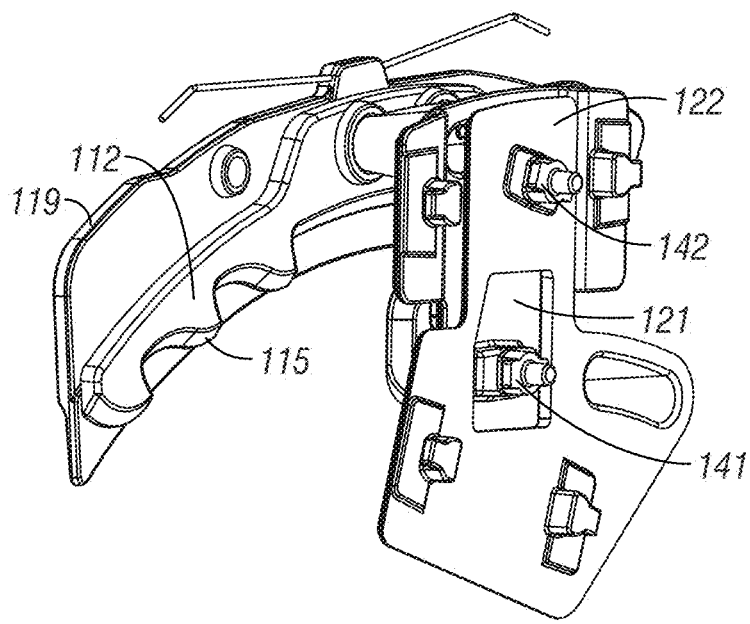
FIG. 17 is a view of an embodiment showing the singulation mechanism with the rotational adjustment removed.

FIG. 16 illustrates a view of the face of the rotary adjustment 114. On the face are cam grooves 131 and 132. These grooves 131, 132 vary in radial distance from the center axis 134 of the rotary adjustment 114. Rotating the rotary adjustment 114 causes the first and second carriages 121, 122 (and thus, first and second blades 112, 113) to move in a linear direction either toward or away from the axis of the seed disc 22, which changes the width of the path between the blades 112, 113 such that the blades can be used with different types and sizes of seeds. With the carriages restricted to linear motion, the engagement of the carriage protrusions, 141 and 142, with the cam grooves, 131 and 132, causes the carriages to change position relative to the rotation of the rotary adjustment 114. The carriages 121, 122, and protrusions 141, 142 can be seen in FIG. 17. However, as noted above, when only one of the blades 112, 113 is to be moved, only one set of grooves can be included on the face of the rotary adjustment 114 such that rotation thereof causes the protrusion in engagement with the groove to move linearly.

The singulator 111 can also be a removable cartridge from the seed meter housing 21 to allow the singulator 111 to be repaired, replaced, cleaned, adjusted, etc. The singulator 111 includes attachment means 117, such as feet extending generally from the bottom side of the singulator 111. The feet 117, which are shown for exemplary purposes, are configured to fit into slots 118 (see FIG. 5) formed integrally with or attached to the inside of the seed meter housing 21. Therefore, to remove the singulator 111, a set of snaps on the singulator are disengaged, allowing the singulator to be rotated and the feet 117 to remove from the slots 118 in the seed meter housing 21, and removing the rotary adjustment 114 through an aperture in the seed meter housing 21. To replace the singulator 111, the feet 117 are positioned in the slots 118, and the rotary adjustment 114 is positioned through the aperture in the seed meter housing 21 to provide access for a user to adjust the spacing between the first and second blades 112, 113. Furthermore, any number or configuration of snaps or other members may be added to the singulator body and/or housing to aid in retaining the singulator in place in the seed meter housing 21.

Figure 15:
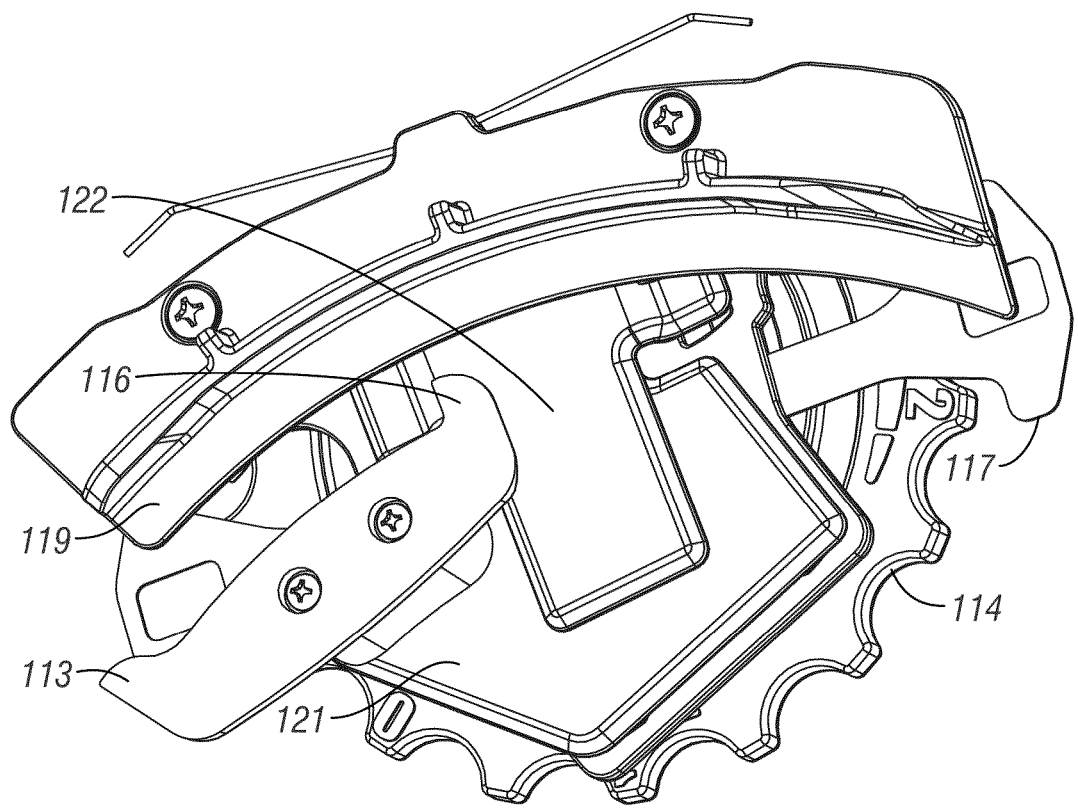
FIG. 15 is a perspective view of an embodiment of the singulation mechanism of FIG. 11.
Figure 15A:
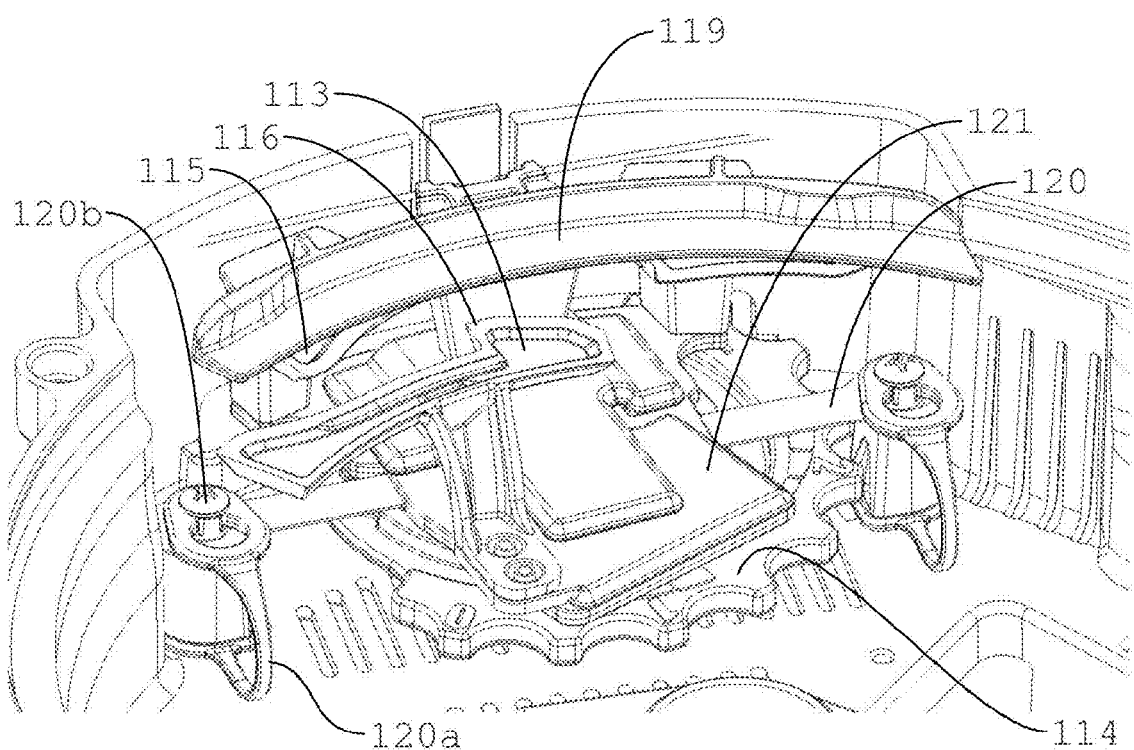
FIG. 15a is a perspective view of another embodiment of a singulation mechanism.

In another embodiment of a singulator mechanism, which is shown generally in FIG. 15a, the singulator 111 does not include a set of snaps and feet 117, but instead is secured to and within the seed meter housing 21 by a tension member 120, such as a flat spring. In this manner, the singulator 111 can be removed from the housing by sliding clips 120a upwardly and then towards the user with respect to boss 120b. Singulator 111 can then be removed from the seed meter housing 21 for repair, replacement, cleaning and adjustment. In other embodiments using the tension member 120, protrusions may extend from the interior of the seed meter housing 21, with apertures of the tension member 120 simply snapping to or otherwise fitting on the protrusions to at least temporarily secure the singulator 111 to the seed meter housing 21.

Figure 18:
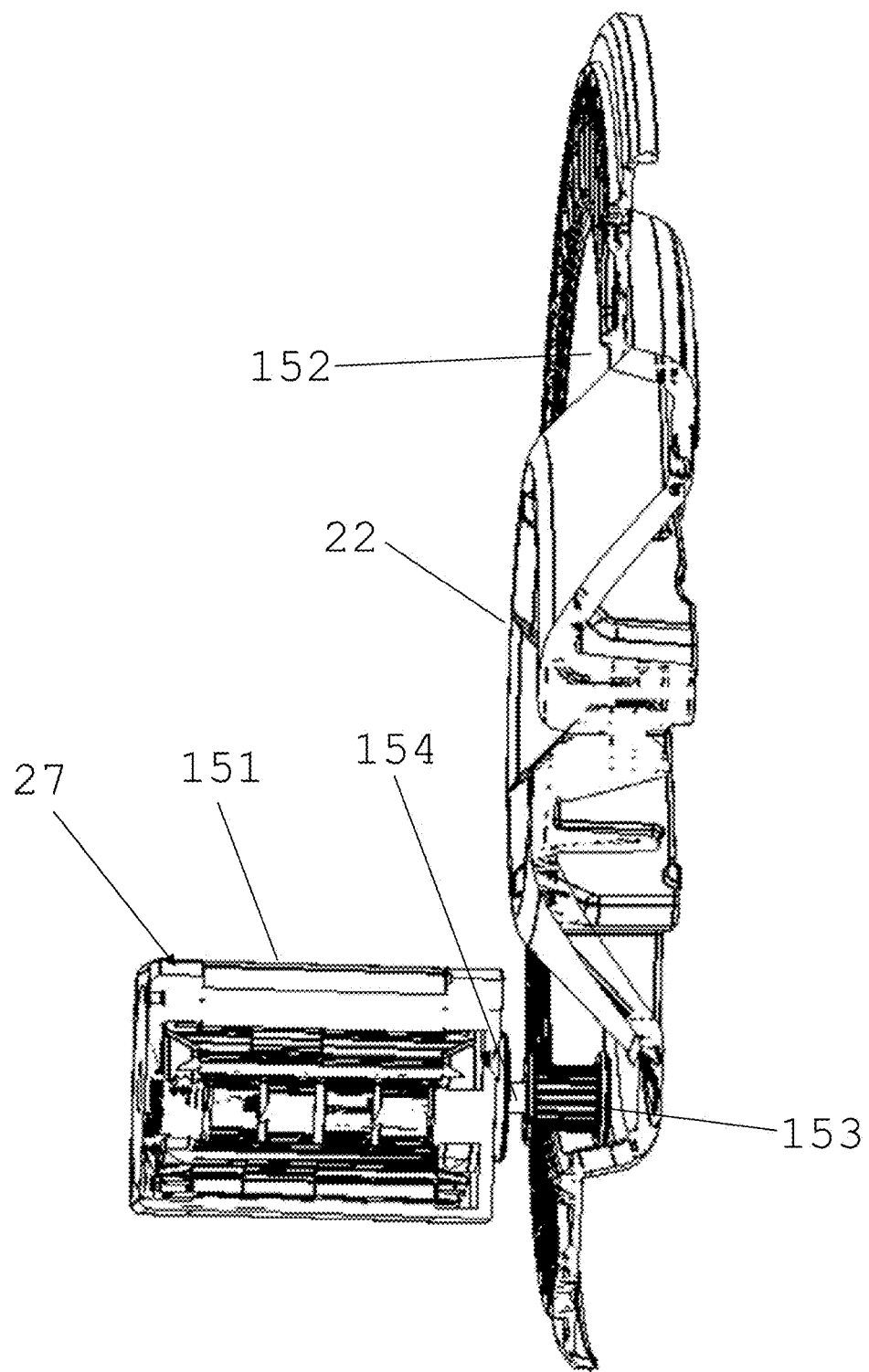
FIG. 18 is a front partial sectional view of an embodiment of the seed disc and a unique drive in operative relations with the housing and other seed meter components hidden for clarity.

FIG. 18 provides an illustration of the interaction between the unique drive 27 and the seed disc 22 according to an exemplary embodiment of the invention. A portion of the seed meter 20 has been sectioned away to show internal components of the assembly. As shown in FIG. 18, the unique drive 27 is mounted externally to the seed meter housing 21 such that an output shaft 154 of the drive 27 protrudes through at least a portion of the seed meter housing 21 perpendicular to and adjacent the face of the reservoir side of seed disc 22. An external gear 153 is mounted on or otherwise forms a portion of the output shaft 154. Integrally molded into, or attached to in some embodiments, the reservoir side of the seed disc 22 is an internal gear feature 152. Said internal gear 152 and said external gear 153 are positioned such that their matching gear teeth engage each other. This engagement allows direct control of the rotational speed of the seed disc 22 via control of the unique drive's 27 rotational output speed of the output shaft 154. In an exemplary embodiment, the unique drive 27 is powered by an electric motor 151, but one skilled in the art may appreciate that the unique drive could also derive its power from a pneumatic or hydraulic rotary motor, as well as any other type of rotary motion, including but not limited to, mechanical, cable drive, or chain.

Figure 19:
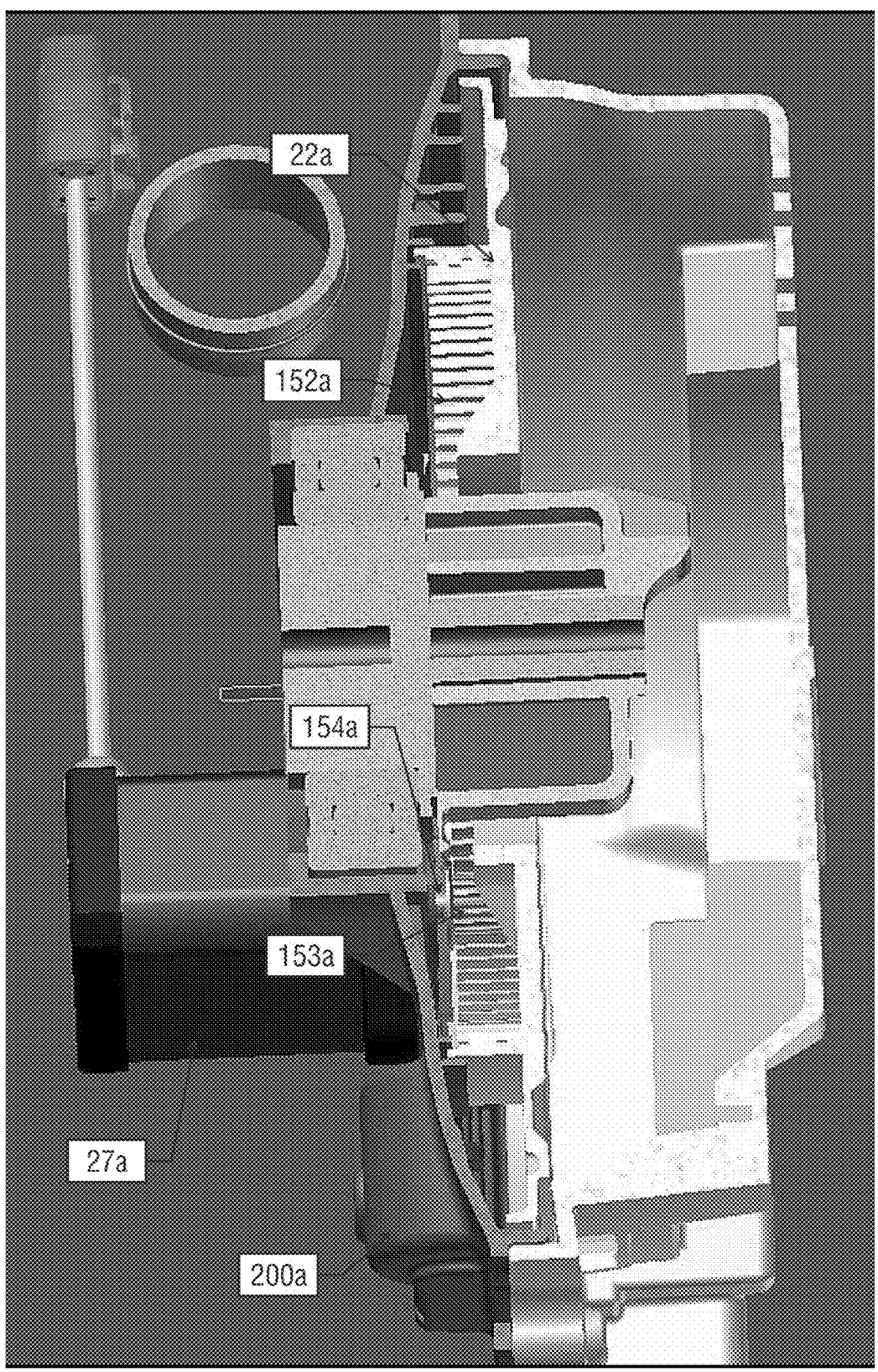
FIG. 19 is a cross-sectional perspective view of another embodiment of a seed meter.
Figure 20:
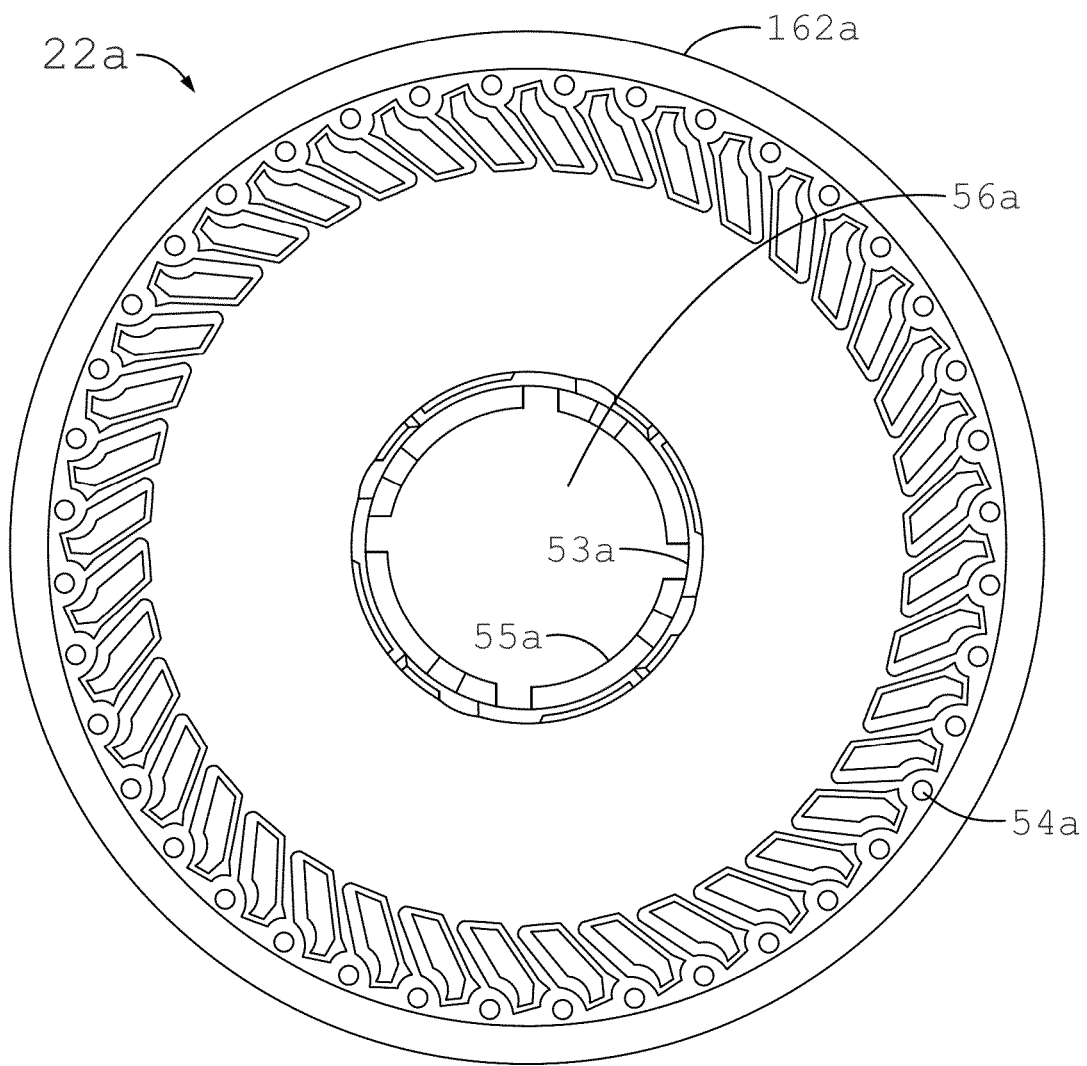
Figure 21:
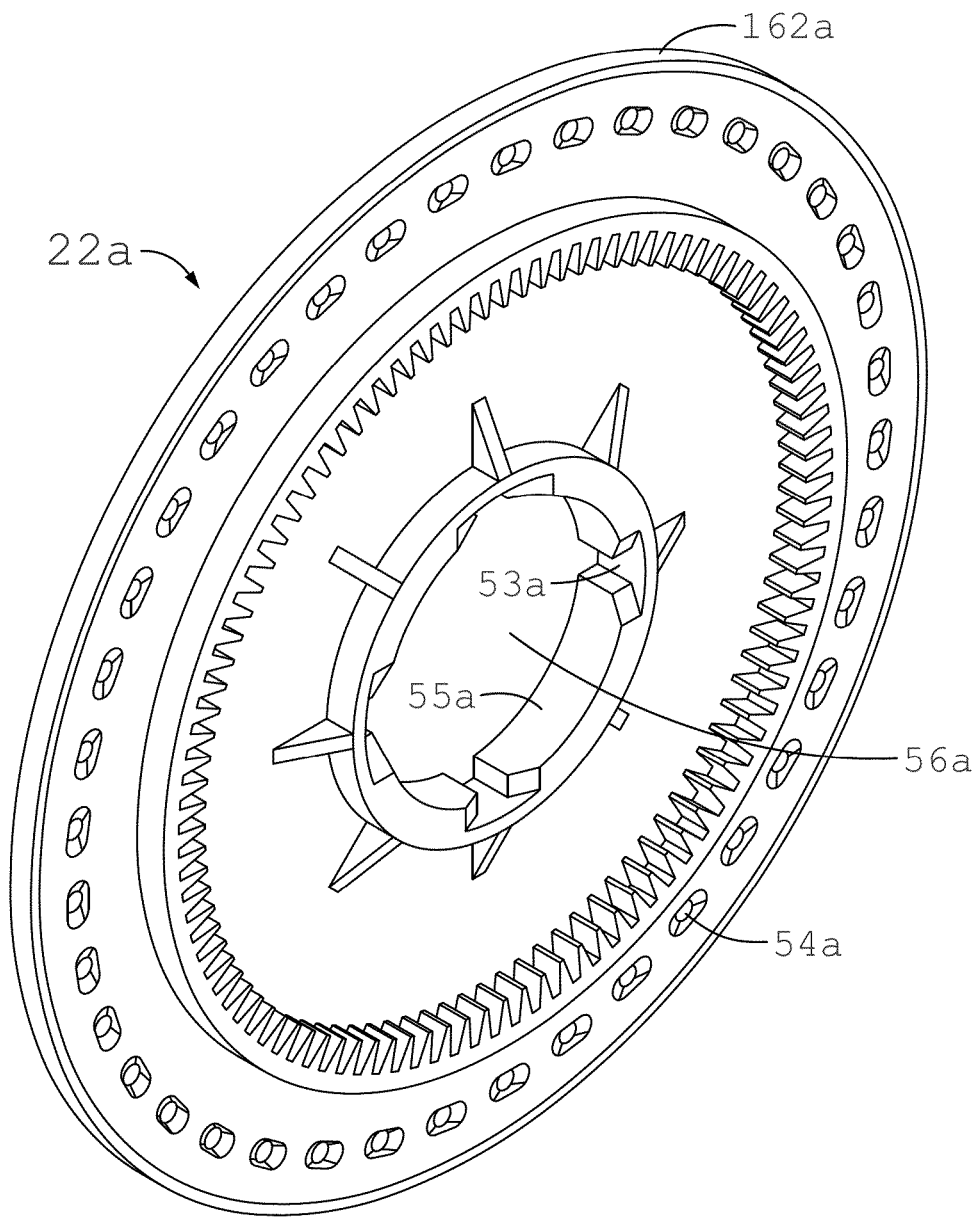
Figure 22:
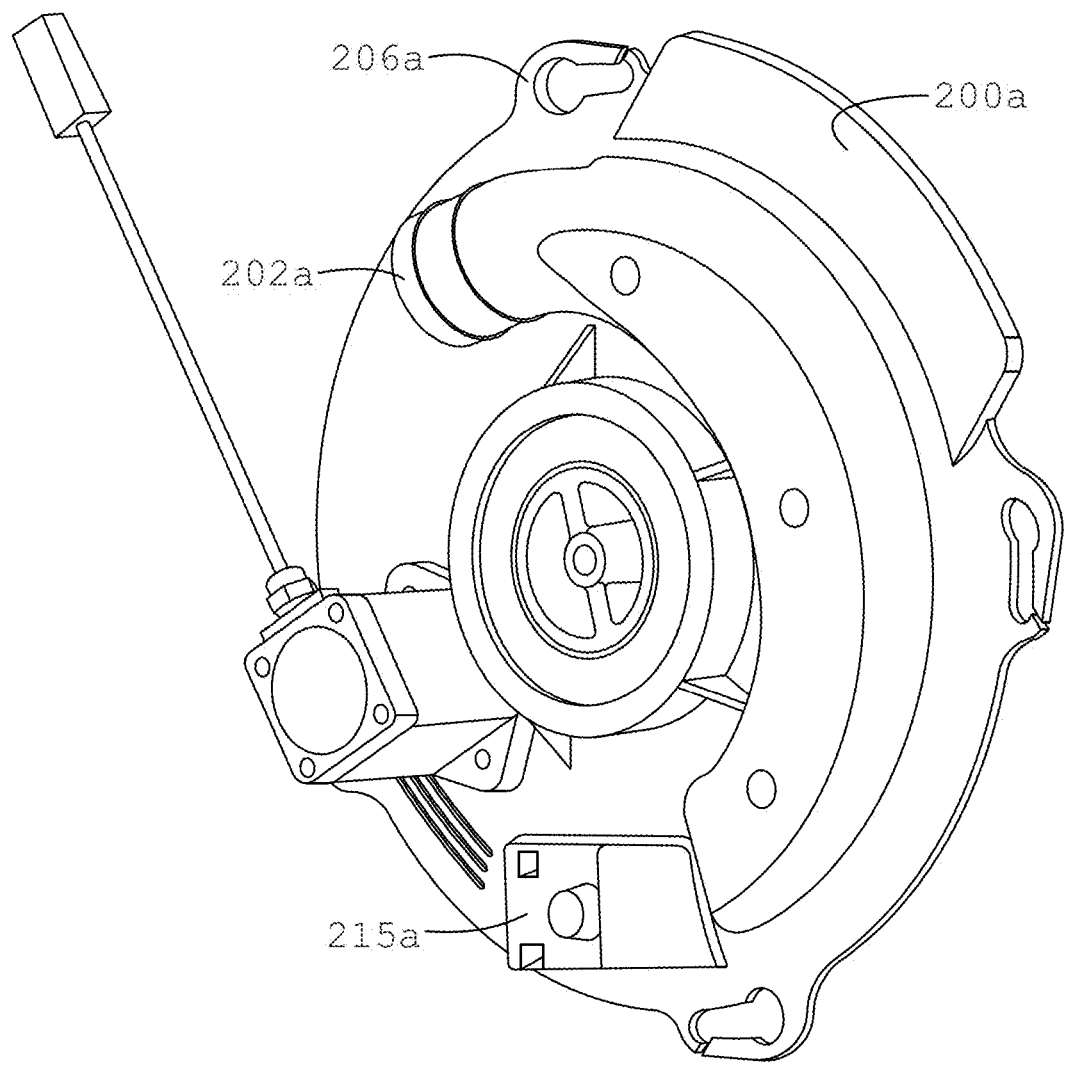

In another embodiment of a seed meter, as shown in FIG. 19, the unique drive 27a is mounted externally to the vacuum housing 200a such that the output shaft 154a protrudes through the vacuum housing 200a substantially perpendicular to and adjacent the face of the vacuum side of the seed disc 22. An external gear 153a is mounted on or otherwise forms a portion of the output shaft 154a. Integrally molded into the vacuum side of the seed disc 22a is an internal gear feature 152a. The internal gear feature 152a may also be a separate element that is attached to an internal ring or flange of the vacuum side of the seed disc 22a. Said internal gear feature 152a and said external gear 153a are positioned such that their matching gear teeth engage each other such that the output of the unique drive 27a rotates the seed disc 22a. FIGS. 20-22 further depict the seed disc 22a and vacuum housing 200a of the modified embodiment.

The control of the speed of the unique drive 27, 27a, and thus seed disc 22, 22a, allows for the spacing of the seeds during planting to be better controlled. As noted, the rotational velocity of the seed disc 22, 22a in relation to the speed of travel of the tractor or other equipment aids in controlling the distance between seeds in a row. Therefore, the addition of the unique drive 27, 27a allows an operator to control the distance by simply adjusting control of the drive 27, 27a. For example, an operator in a tractor could adjust the rotational speed via remote or other control interface such that the distance between seeds could be adjusted during planting. This can result in significant time savings, as the operator does not have to stop planting to adjust seed rate of the meter, thus allowing a field to be efficiently planted with varied planting conditions.

Figure 23A:
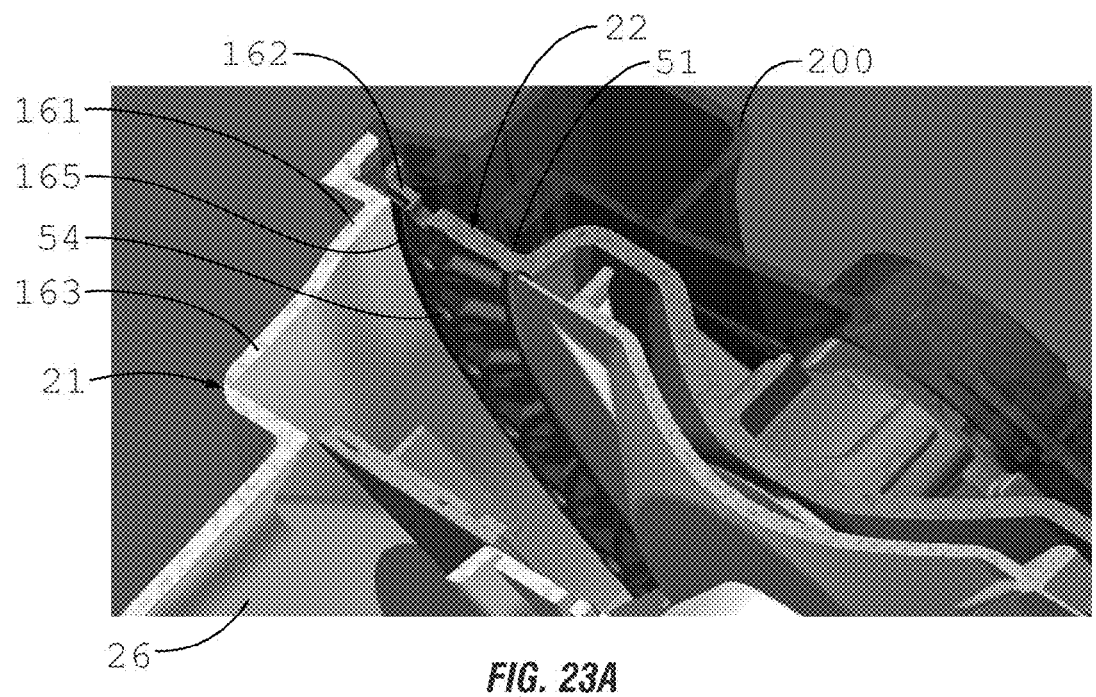
FIGS. 23a and 23b are sectional perspective views of an embodiment of the interface between the seed disc and the seed meter housing.
Figure 23B:
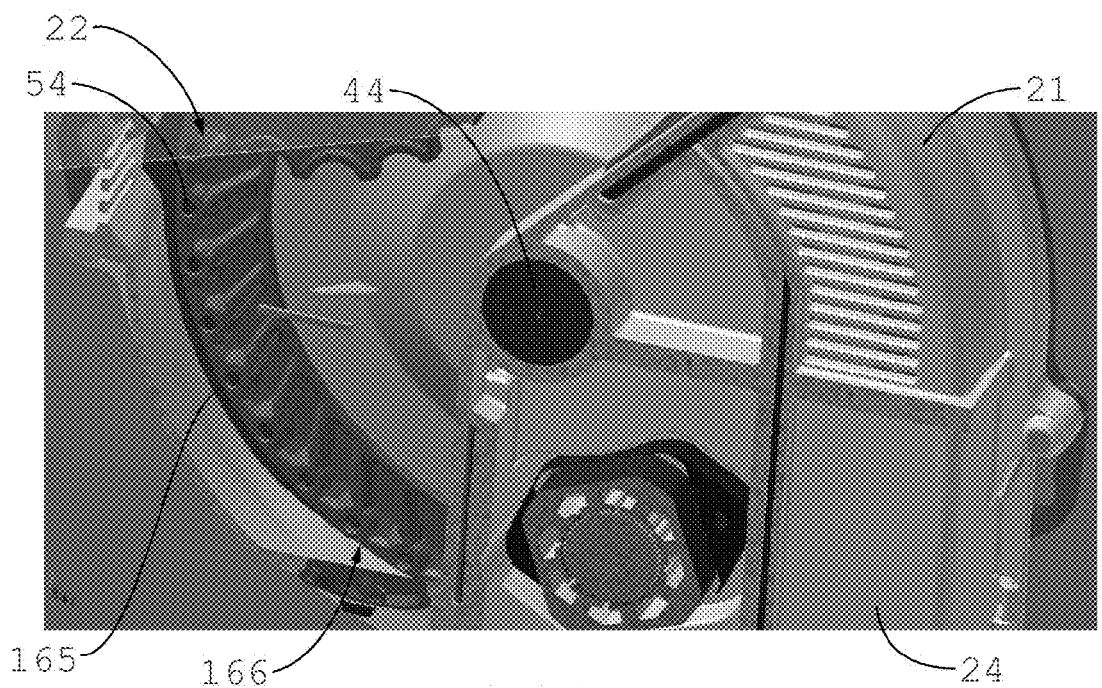

Referring to FIGS. 23a and 23b, an enlarged and sectional view of the seed meter 20 is shown detailing the interface between the seed disc 22 and the seed meter housing 21. In certain areas, an offset portion 161 of the outer sidewall 163 is provided to be eccentric with the outer circumference (e.g., annular rim 162) of the seed disc 22. A relief member 165, which is also shown in FIG. 5, covers the space created by the offset portion 161 between the seed cell 54 of the seed disc 22 and the bottom edge of outer sidewall 163. For example, as shown in FIG. 23a, the offset portion 161 is eccentric with the seed disc 22 at the loading zone 166, i.e., the area of the seed meter 22 where the seed pools and is agitated prior to being drawn onto or against a seed cell 54. The area created by offset portion 161 and covered by the relief member 165 gives the seed additional room to move about and be drawn onto or against the seed cell 54, which reduces the likelihood of the seed being knocked free from the seed cell 54 by the seed meter housing 21 during rotation of the seed disc 22. The relief member 165 also aids in orienting the seed in the seed cell 54 such that a greater surface area of the seed will fit in the cell 54 to provide the strongest suction on the seed at the cell 54.

The relief member 165 essentially creates a false outer wall of the seed meter housing 21. As mentioned above and shown best in FIGS. 12 and 13, the reservoir side of the seed disc 22 will include an outer chamfer 94 and an extension 95 that ends at the annular rim 162 of the seed disc 22. As mentioned above, the outer chamfer 94 and extension 95 creates a false edge for the seed disc 22, which allows the seed cells 54 to be positioned generally at the outer edge of the false edge. While the false edge created by the outer chamfer 94 and extension 95 aids in releasing seed, they can make it difficult for the seed to attach to a seed cell 54 at the seed pool due to the decreased suction at the outer edge of the seed disc 22. The offset portion 161 and relief member 165 counteract this by creating a "false wall". The so-called false wall created by the relief member 165 will extend from the outer chamfer 94 to the outer wall of the seed meter housing 21. The width of the false wall (relief member 165) will make it appear as though the seed is being attached at a location further inward on the seed disc 22, with the relief member providing a barrier to create more suction at the seed cell 54 to increase the consistency of seed attaching to the seed cells 54. The relief member 165 and offset 161 can extend to the entrance of the singulator 111, which is used to ensure that only one seed is positioned at each seed cell 54.

An air seed meter for dispensing seed in a field has been provided. The exemplary embodiments shown and described contemplate numerous variations, options, and alternatives, and are not to be limited to the specific embodiments shown and described herein. For example, the improvements described herein are equally applicable to other meters, such as positive-air meters like that disclosed in U.S. Pat. No. 4,450,959 to Deckler, which is incorporated herein by reference in its entirety. The foregoing description has been presented for purposes of illustration and description, and is not intended to be exhaustive list or to limit the exemplary embodiment to precise forms disclosed. It is contemplated that other alternative processes obvious to those skilled in the art are considered to be included in the invention.

What is claimed is:

1. An air seed meter, comprising:
a housing including an inner chamber;
a disc mounted in said housing for rotation about an axis and having a plurality of seed cells spaced radially about the axis for retaining seeds; and
an adjustable singulator for eliminating seed multiples from said seed cells, said singulator including two blades adjacent to and at least partially surrounding the seed cells;
wherein the blades of the singulator are simultaneously adjustable such that a first blade is translated radially away from the axis while a second blade is adjusted radially toward the axis, and that the first blade is adjustable radially toward the axis while the second blade is adjusted radially away from the axis; and said singulator comprising a curved rim portion extending perpendicular to the disc and at least partially biased towards the axis of the disc.

2. The air seed meter of claim 1 wherein the first blade is located radially inward from the seed cells and the second blade located radially outward of the seed cells.

3. The air seed meter of claim 1 wherein said curved rim portion is positioned near the first blade and configured to substantially match the curvature of the disc.

4. The air seed meter of claim 1 wherein the first blade comprises at least one ramp extending from the blade and toward the axis.

5. The air seed meter of claim 1 wherein the second blade comprises at least one ramp extending from the blade and away from the axis.

6. The air seed meter of claim 1 further comprising a rotary adjustment operatively connected to the first and second blades, wherein rotation of the rotary adjustment adjusts the spacing between the first and second blades.

7. The air seed meter of claim 6 further comprising a first carriage attached to the first blade, and a second carriage attached to the second blade.

8. The air seed meter of claim 7 wherein the rotary adjustment includes at least one cam groove operatively connected to a protrusion of the first or second carriage, wherein the rotation of the rotary adjustment causes the cam groove to interact with the carriage to adjust the spacing between the first and second blades.

9. The air seed meter of claim 8 wherein at least one of the first or second carriages moves during rotation of the rotary adjustment.

10. The air seed meter of claim 1 wherein the first blade is biased toward the axis of the disc.

11. The air seed meter of claim 1 wherein the singulator further comprises attachment means for removably attaching the singulator to the housing.

12. A singulating mechanism for use with an air seed meter of an agricultural implement, the singulating mechanism positioned adjacent a seed disc having a radial array of seed cells, the mechanism comprising:
 a first blade positioned adjacent an outer edge of the seed cells of the seed disc, and comprising at least one ramp extending toward the seed cells;
 a second blade located adjacent an inner edge of the seed cells of the seed disc and comprising at least one ramp extending toward the seed cells;
 wherein the first and second blades are both adjustable both toward and away from the seed cells to adjust the spacing between the ramps of the first and second blades; and
 a curved rim portion extending perpendicular to the disc and at least partially biased towards the axis of the disc.

13. The singulating mechanism of claim 12 wherein the blades are simultaneously adjustable such that the first and second blade move together toward the array of seed cells or move together away from the array of seed cells.

14. The singulating mechanism of claim 13 further comprising a rotary adjustment operatively connected to the first and second blades and configured to adjust the distance between the first and second blades.

15. The singulating mechanism of claim 14 wherein the rotary adjustment comprises at least one cam groove in communication with either the first or the second blade, wherein rotation of the rotary adjustment adjusts the location of the first or second blade based upon the shape of the cam groove.

16. The singulating mechanism of claim 15 further comprising first and second carriages positioned between the first and second blades and the rotary adjustment, wherein the blades are connected to the carriages and the carriages are in communication with the cam groove.

17. The singulating mechanism of claim 12 wherein the curved rim portion is adjacent the first blade and configured to substantially match the curvature of the seed disc.

18. A combination seed disc and singulator, comprising:
 the seed disc comprising a cylindrical member having a vacuum side and a seed reservoir side, the seed disc comprising a radial array of seed cells spaced from an axis;
 the singulator comprising a first blade including at least one ramp positioned adjacent an outer edge of the seed cells and extending generally toward the axis, and a second blade including at least one ramp positioned adjacent an inner edge of the seed cells and extending generally away from the axis; and
 a rotary adjustment operatively attached to the singulator such that rotation of the rotary adjustment adjusts the distance between the ramps of the first and second blades by moving at least one of the first or second blades; and
 a curved rim portion extending perpendicular to the disc and at least partially biased towards the axis of the disc.

19. The combination of claim 18 wherein rotation of the rotary adjustment causes simultaneous movement of the first and second blades either generally towards one another or generally away from one another.

20. The combination of claim 19 wherein the curved rim portion is adjacent the first blade and configured to substantially match the curvature of the seed disc, and the singulator biased toward the axis of the seed disc.

\* \* \* \* \*